United States Patent [19]

Nicholas et al.

[11] Patent Number: 4,860,447

[45] Date of Patent: Aug. 29, 1989

[54] METHOD AND APPARATUS FOR COUPLING CONNECTORS TO RIBBON CABLES

[75] Inventors: Vincent Nicholas, Spring Hill; Paul P. Siwinski, Seminole, both of Fla.

[73] Assignee: AMP Incorporated, Harrisburg, Pa.

[21] Appl. No.: 168,308

[22] Filed: Mar. 15, 1988

[51] Int. Cl.[4] ........................ H01R 43/04; B23P 19/00

[52] U.S. Cl. ........................................ 29/863; 29/741; 29/753; 29/33 M; 29/861

[58] Field of Search ................. 29/861, 749, 753, 755, 29/564.1, 33 M, 564.4, 863; 174/117 F, 117 FF; 439/465, 492, 494, 497, 499

[56] References Cited

U.S. PATENT DOCUMENTS 4,017,954 4/1977 Grubb .................................. 29/749
4,040,704 8/1977 Huber .
4,040,705 8/1977 Huber .
4,077,695 3/1978 Bakermans ........................ 29/749 X
4,094,564 6/1978 Cacolici .
4,140,360 2/1979 Huber .
4,163,598 8/1979 Bianchi et al. .
4,181,384 1/1980 Dola et al. .
4,252,397 2/1981 Eigenbrode et al. .
4,260,209 4/1981 Zell et al. .
4,269,466 5/1981 Huber .
4,279,074 7/1981 Zell et al. .
4,308,660 1/1982 Brown et al. .
4,326,764 4/1982 Asick et al. .
4,351,110 9/1982 Folk .
4,352,531 10/1982 Gutter .
4,359,620 11/1982 Keller .
4,367,909 1/1983 Shatto et al. .
4,415,216 11/1983 Narozny .
4,451,099 5/1984 Bricker, Jr. et al. .
4,491,381 1/1985 Hamsher, Jr. et al. .
4,602,831 7/1986 Lockard .
4,616,893 10/1986 Feldman .
4,667,398 5/1987 Leiby ................................ 29/753 X
4,747,787 5/1988 Siwinski .
4,765,044 8/1988 Wilson et al. ...................... 29/33 M

FOREIGN PATENT DOCUMENTS 783215 4/1968 Canada ............................... 439/492

OTHER PUBLICATIONS

"Amplatch" Ribbon Cable Connector System, AMP Incorporated Catalog No. 73-177, pp. 74–78.

*Primary Examiner*—Howard N. Goldberg
*Assistant Examiner*—Carl J. Arbes
*Attorney, Agent, or Firm*—Robert W. Pitts

[57] ABSTRACT

Apparatus for coupling the stripped free end of a ribbon cable with a connector comprising a fixed recipient block having a slot for the receipt of the striped and bent wires of a ribbon cable; reciprocable blocks located on opposite sides of the fixed recipient block with crimping fingers secured thereto and reciprocal through apertures in the fixed recipient block; and means to move the reciprocable blocks and crimping fingers toward each other into the slot for effecting the mechanical coupling of the connector housing locate din the slot with at least some of the stripped wires. Also disclosed is the method of coupling connectors to the free ends of cables with such apparatus.

11 Claims, 22 Drawing Sheets

METHOD AND APPARATUS FOR COUPLING CONNECTORS TO RIBBON CABLES

BACKGROUND OF THE INVENTION

1. Field of the Invention

This invention relates to coupling connectors to ribbon cables and, more particularly, to a method and apparatus for crimping connectors onto stripped free ends of ribbon cables to effect their coupling.

2. Description of the Background Art

The development of new electrical cables in which a large number of wires are encapsulated in a flat insulating web has produced significant advantages in computers, telecommunication devices and the electronics industry generally. These cables are presently manufactured with conductors formed as fine parallel wires located on closely spaced centerlines. Such wires may be used for transmitting either electrical power or electrical signals.

Along with the obvious advantages of size reduction, wire separation and identification, and general ease of handling, such flat cables also present disadvantages. For example, the fineness of the wires and the closeness of their spacing generally increase wire handling difficulties during termination of the cable ends, i.e., during the stripping of the insulation from the ends of the wires, during the identification and bending of preselected wires and during the attaching of the individual wires to electrical components such as connectors. The development of even smaller cables with finer, more closely spaced wires, further aggravates these problems. This, in turn, further complicates cable end termination including the interconnection of such cables to their connectors. Additionally, when flat cables are used for signal transmission purposes, the closeness of wire centerlines dictates their positioning at specific, precise, constant locations for a particular application if the accurate transmission of signals is to be accomplished. The background art discloses many connectors for ribbon cables as well as many techniques for preparing ribbon cable ends and attaching such prepared ends to connectors. Note, U.S. Pat. No. 4,260,209 to Zell which discloses an insulation displacement connector with a slotted beam and an application tool for providing mass termination of a pre-stripped ribbon cable. There is, however, no teaching or suggestion of selective wire bending or soldering of selective wires of the ribbon cable to the terminals of the connector. U.S. Pat. No. 4,367,909 to Shatto, like the patent to Zell, discloses an insulation displacement connector with a slotted beam but employs a plurality of funnel entries at one end to guide the conductor wires to new centerlines. Again, such disclosure does not teach or suggest any method or apparatus for conveniently and accurately bending such wires selectively to facilitate their positioning nor does it disclose soldering wires to a connector. The Bricker patent, U.S. Pat. No. 4,451,099, also discloses an insulation displacement connector with a slotted beam. There is no disclosure of any associated method or apparatus for the preparation of the cable ends or for coupling of the prepared cable ends to a connector. Lastly, U.S. Pat. No. 4,616,893 to Feldman discloses a connector for board-to-board coupling. Such disclosure, however, does not teach or suggest any method or apparatus for preparing ribbon cables nor any method or apparatus for use in coupling ribbon cables with associated connectors.

None of these patents discloses a method or apparatus for efficiently stripping and bending the wires at the ends of a ribbon cable and attaching such stripped and bent wires of the ribbon cable to connectors as herein disclosed. Further, there is no background disclosure of a method or apparatus capable of terminating the ends of ribbon cables wherein such ribbon cables have wires are as small as 0.008 inches in diameter as contemplated by the present invention. This is significantly smaller than wires previously employed. Such significantly reduced wire diameters will allow for the proportionate reduction in the spacing between centerlines to 0.0125 inches along with a proportionate increase in the number of wires per ribbon cable to 81 wires per linear inch.

No background patent or other background disclosure teaches or suggests the efficient, convenient, accurate, and economical cable terminating method and apparatus as described herein. Known methods and apparatus are simply lacking in one regard or another.

As illustrated by the background disclosures, efforts are continuously being made in an attempt to connect electrical elements of ever decreasing size. No prior effort, however, suggests the present inventive combination of method steps and component elements arranged and configured for terminating the fine, closely spaced wires at the stripped end of a ribbon cable as disclosed and claimed herein. Prior methods and apparatus do not provide the benefits attendant with the present invention. The present invention achieves its purposes, objectives and advantages over the prior methods and apparatus through a new, useful and unobvious combination of method steps and component elements, through the use of a minimum number of functioning parts, at a reduction in cost to manufacture and operate, and through the utilization of only readily available materials and conventional components.

These objects and advantages should be construed as merely illustrative of some of the more prominent features and applications of the present invention. Many other beneficial results can be attained by applying the disclosed invention in a different manner or by modifying the invention within the scope of the disclosure. Accordingly, other objects and advantages as well as a fuller understanding of the invention may be had by referring to the summary and detailed description of the preferred embodiment of the invention in addition to the scope of the invention as defined by the claims taken in conjunction with the accompanying drawings.

SUMMARY OF THE INVENTION

The present invention is defined by the appended claims with the specific preferred embodiment shown in the attached drawings. For the purposes of summarizing the invention, the invention may be incorporated into a method for attaching the conductor wires of the stripped free end of a ribbon cable to a connector housing comprising the steps of positioning the stripped free end in a guide member; providing a coupling fixture having a fixed recipient block with a slot for the initial receipt of a connector housing and for the subsequent receipt of the stripped free end, the coupling fixture having crimping fingers reciprocable toward and away from the slot to effect the bending of at least a portion of the connector housing into crimping engagement with at least some of the wires to thereby couple the connector to the wires; and moving the crimping fingers between an inoperative orientation whereat the crimping fingers are remote from the slot and an operative orientation whereat the crimping fingers are adjacent to the slot for the crimping of the connector onto the wires. The method further includes the step of gripping that portion of the connector which had been crimped and moving the remainder of the connector housing with respect thereto whereby the remaining wires are brought into contact with other portions of the connector housing. The portion of the connector housing which is crimped is a ground bus. The wires which are crimped to the ground bus are unbent ground wires. The method further includes the step of gripping the ground bus and moving the remainder of the connector housing with respect to the ground bus whereby the remaining non-ground wires are brought into contact with signal contacts of the connector housing. The method further includes the reflow soldering of the wires to the connector housing.

The invention may further be incorporated into coupling apparatus for coupling the stripped free end of a ribbon cable with a connector housing for use in association with apparatus for terminating the free end of a ribbon cable. The coupling apparatus comprises a fixed recipient block having a slot for the receipt of the stripped and bent wires of a ribbon cable; reciprocable blocks located on opposite sides of the fixed recipient block with crimping fingers secured thereto and reciprocal through apertures in the fixed recipient block; and means to move the reciprocable blocks and crimping fingers toward each other into the slot for effecting the mechanical coupling of the connector housing located in the slot with at least some of the stripped wires. The slot is of a size and shape to receive a connector housing prior to the receipt of the free end of the ribbon cable, the connector housing having electrically conductive signal contacts and an electrically conductive bus bar slidingly received within an electrically insulating portion of the connector housing. The means to move the reciprocal blocks and crimping fingers includes primary handles rotatable about axes parallel with the width of the cable and located on opposite sides thereof whereby the crimping fingers move perpendicularly with respect to the plane of the cable. The coupling apparatus further includes pinching fingers located on opposite sides of the bus bar of the connector housing to hold the bus bar against movement after the crimping fingers have crimped the bus bar to the ground wires. The coupling apparatus further includes secondary handles mounted on an axis parallel with the first axes to move the pinching fingers into and out of pinching engagement with the bus bar. The coupling apparatus further includes tertiary handles to urge the connector housing away from the pinching fingers while the pinching fingers are in engagement with the bus bar whereby the connector housing will slide with respect to the pinched ground bus to drive the signal contacts of the connector housing into contact with bent wires of the ribbon cable which have not been pinched. The pinched wires are unbent ground wires and the other wires are bent signal wires. The cable to be terminated is supported in a guide member with a taper in the edge thereof which supports the stripped free end of the cable and wherein the edge of the slot of the fixed recipient block which is adapted to receive guide member is tapered for matingly receiving the guide member in a precise orientation.

The foregoing has outlined rather broadly the more pertinent and important features of the present invention in order that the detailed description of the invention that follows may be better understood whereby the present contribution to the art may be more fully appreciated. Additional features of the invention will be described hereinafter which form the subject of the claims of the present invention. It should be appreciated by those skilled in the art that the conception and the specific embodiment disclosed herein may be readily utilized as a basis for modifying or designing other methods and apparatus for carrying out the same purposes of the present invention. It should be also realized by those skilled in the art that such equivalent methods and apparatus do not depart from the spirit and scope of the invention as set forth in the appended claims.

BRIEF DESCRIPTION OF THE DRAWINGS

For a more complete understanding of the nature, objects and advantages of the present invention, reference should be had to the following detailed description taken in conjunction with the accompanying drawings in which.

Similar reference characters refer to similar parts throughout the several drawings.

DETAILED DESCRIPTION OF THE INVENTION

Figure 1:
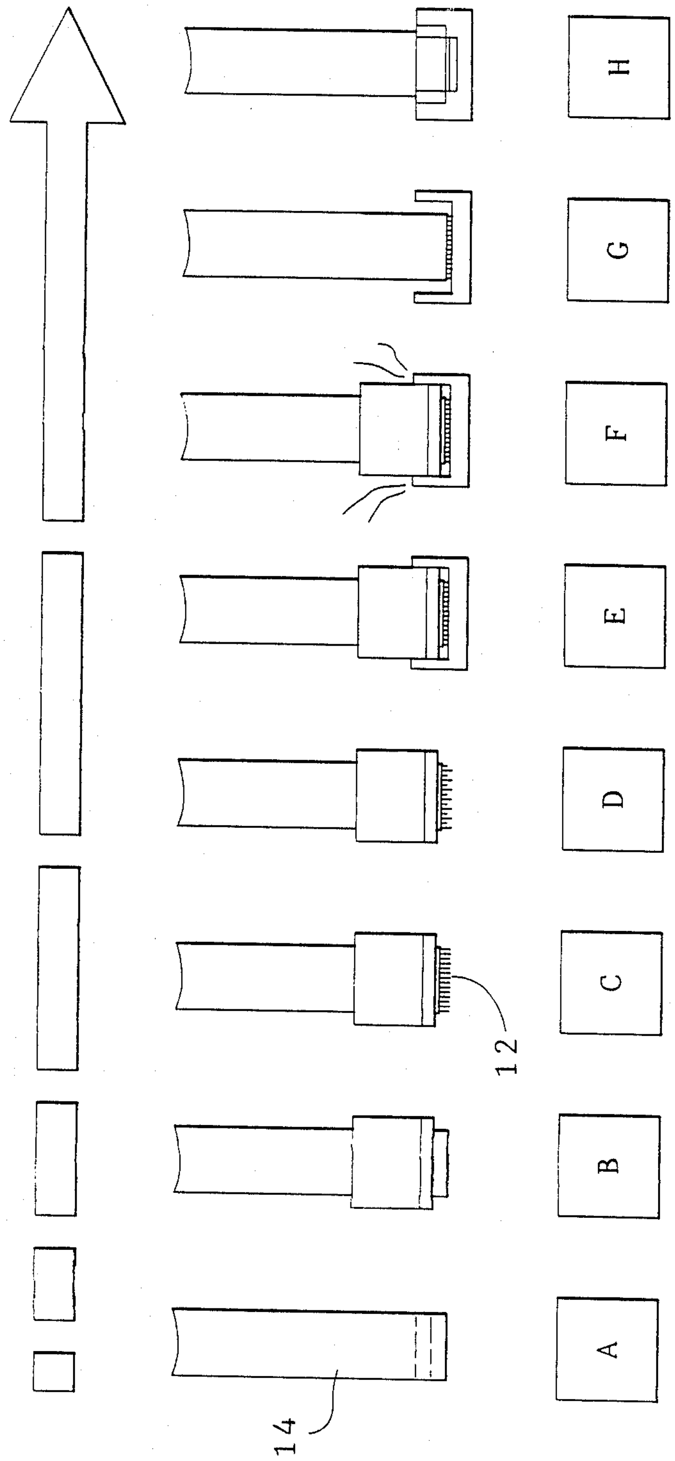
FIG. 1 is a diagramatic, flow-type, schematic illustration showing the various steps and stations involved in terminating a ribbon cable with extremely closely spaced conductors including: Station A whereat a cable is stripped and trimmed to receive a guide member which will control the cable end during subsequent steps; Station B whereat a guide member is removably coupled to the cable end; Station C whereat the cable end is stripped of its insulation; Station D whereat certain cable wires are selectively bent; Station E whereat the cable end and guide are inserted into a connector attaching mechanism and the connector is crimped thereto; Station F whereat the wires of the cable end are soldered to the connector by a radio frequency (RF) loop; Station G whereat the guide member is removed from the cable; and Station H whereat the connector covers are attached to the connector housing to thereby constitute a ribbon cable terminated with a connector.

The present invention relates to a method and apparatus for terminating the free end or ends of flat electrical cable conductors known generally as ribbon cables. Such terminating includes the forming, stripping and bending of the wires of the cable end as well as the attaching of their wires to a connector as for subsequent coupling with a mating portion of an electronic machine. FIG. 1 illustrates schematically the method and apparatus associated with each step or station in the termination of such cable end.

Overview

The eight steps or stations utilized in terminating cable ends in accordance with the principles of the present invention are indicated as letters A through H in FIG. 1. The arrow indicates the flow of work which equates to the sequence of steps. The cable end being terminated is shown as progressing through these various stations or steps.

From an overview standpoint, at the shaping and trimming Station A, a cable end is formed, trimmed, and then positioned for receiving a handling fixture or guide member. The guide member is utilized throughout the majority of the processing steps or stations for accurately positioning the received and held cable end wires at the subsequent stations. The guide member can readily be seen in FIG. 2 as an exploded perspective illustration and in FIG. 3 in its assembled state.

Figure 3:
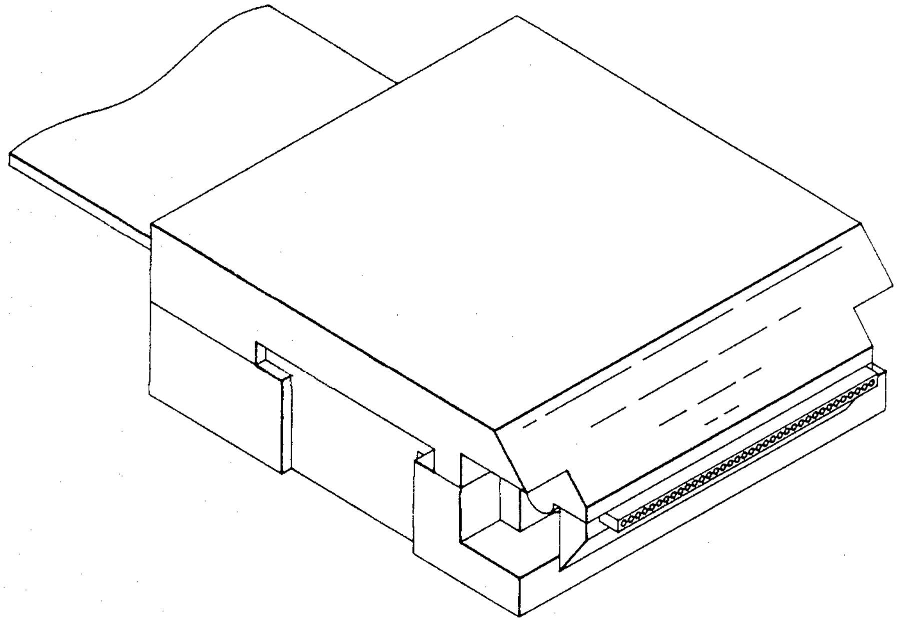
FIG. 3 is an isometric showing similar to FIG. 2 but with the cable and the components of the guide member in an assembled condition.

Guide member applying station B illustrates the guide member on a cable end wherein the formed and trimmed portion of the cable near its associated end is specifically located and positioned through appropriate parts of the guide member. FIG. 3 illustrates the guide member secured to the cable end.

The third station is the stripping station C. This station can be most readily understood by reference to FIGS. 4 and 10 wherein a predetermined length of insulation is partially cut by knife blades. Motion between the knife blades and cable then pulls the cut insulation from the cable end and thereby creates the trimmed end of a predetermined length at a predetermined distance from its adjacent bend in the cable, i.e. the shaped portion of the cable.

Figure 5:
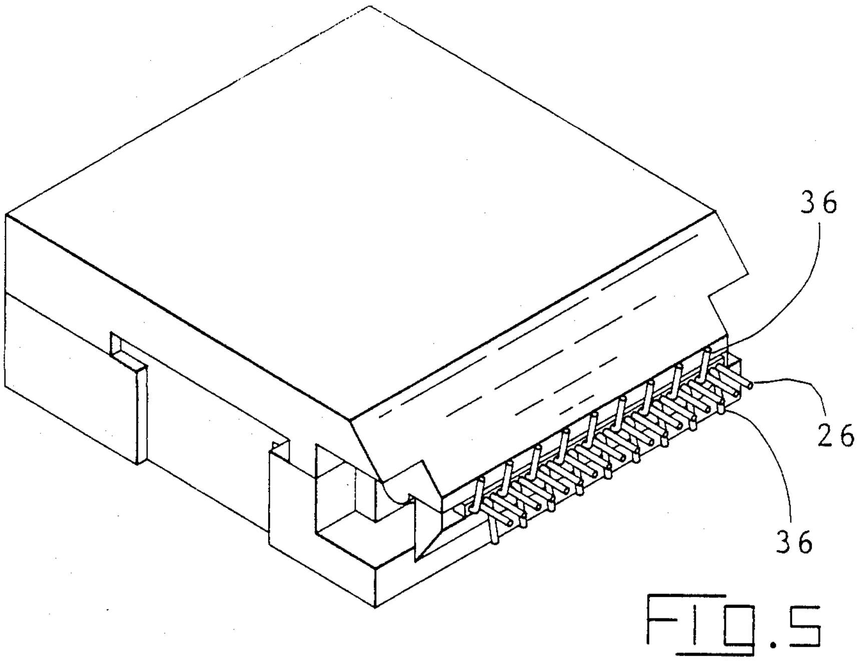
FIG. 5 is an isometric showing illustrating the stripped wires after exiting the wire bending mechanism.
Figure 18:
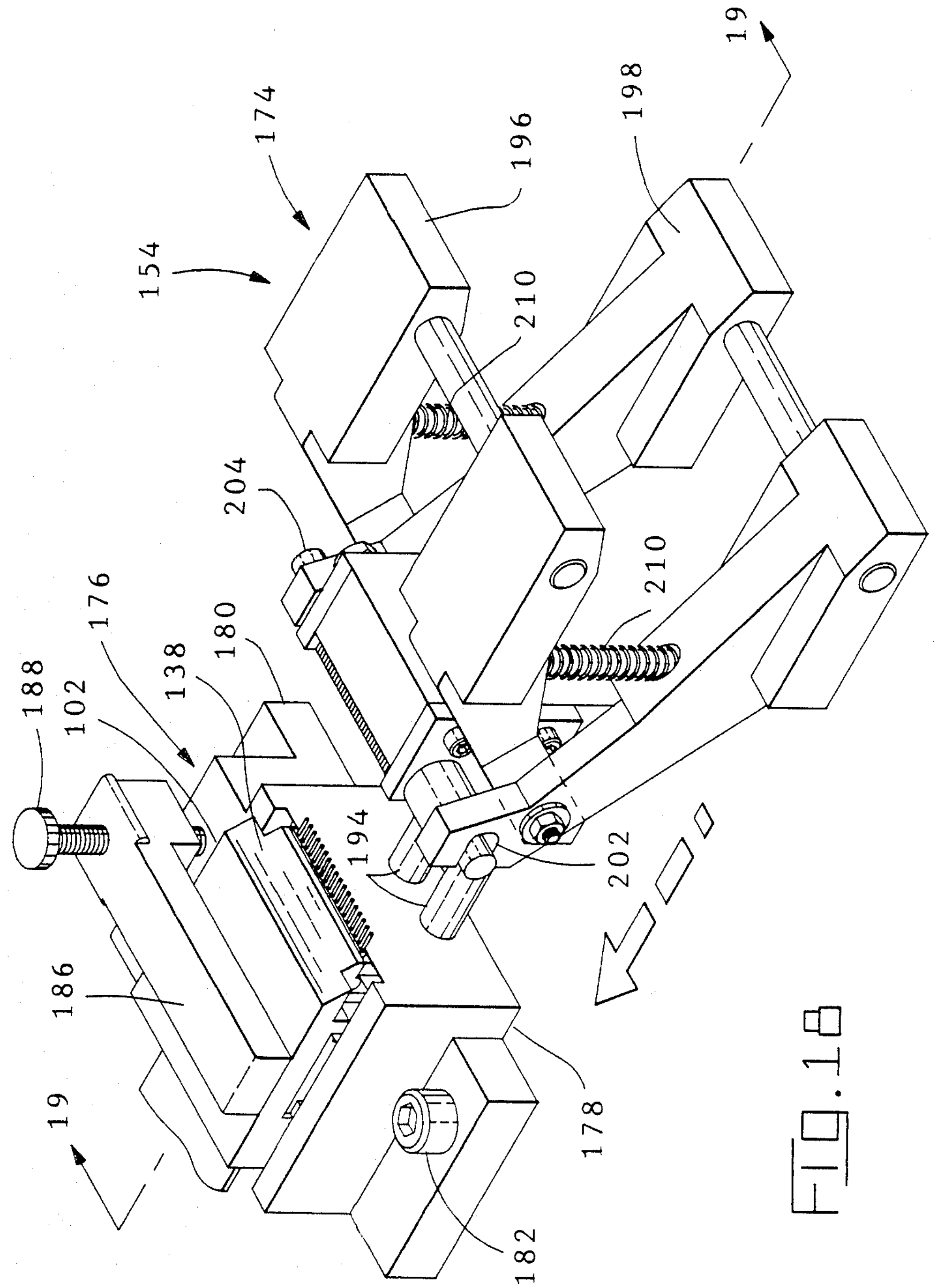
FIG. 18 is an isometric showing of the wire bending station.
Figure 19:
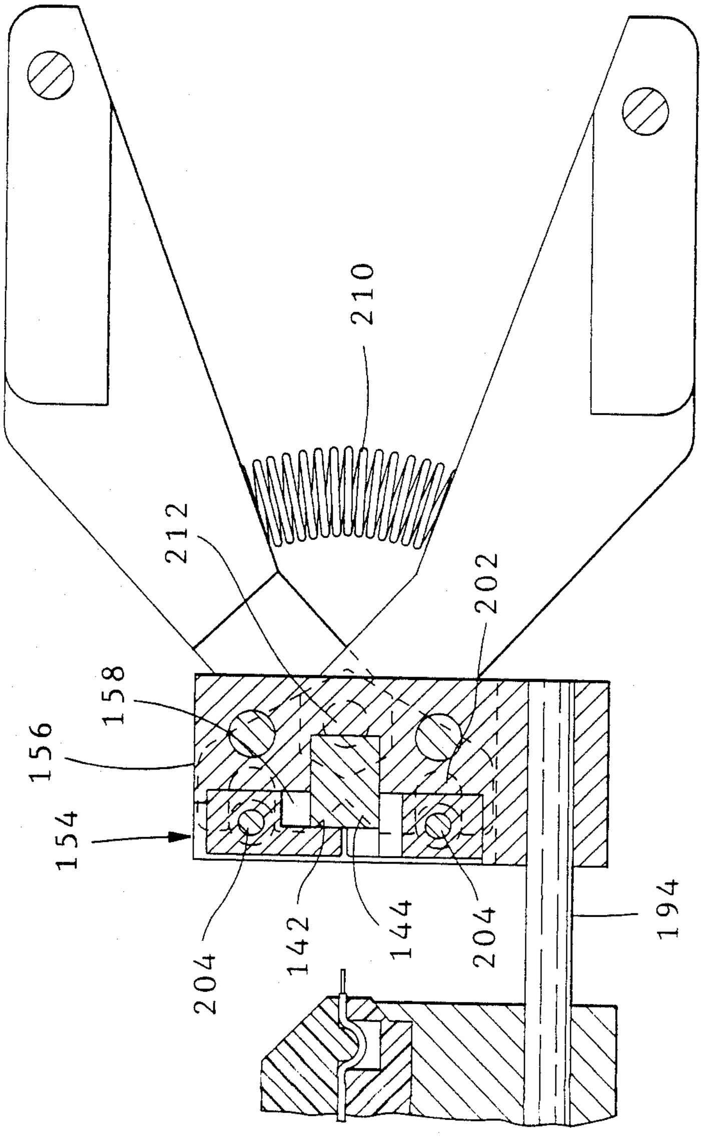
FIG. 19 is a partial cross-sectional view of the wire bending mechanism taken along the line 19—19 of FIG. 18.
Figure 20:
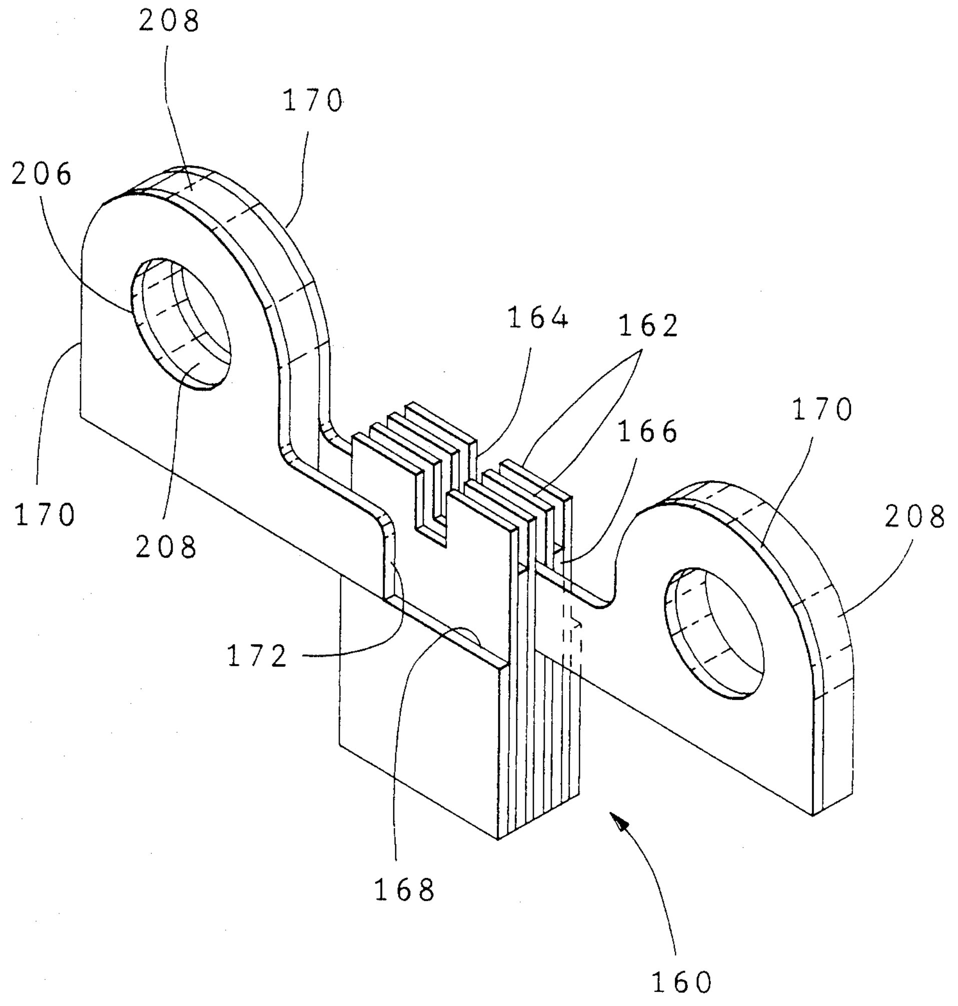
FIG. 20 is a perspective illustration of the operative part of the wire bending mechanisms shown in FIGS. 18 and 19.

The next station is the wire bending station D. This station effects the appropriate bending of stripped signal wires. The ground wires, located between the signal wires, are not bent. Alternate signal wires are preferably bent in alternate directions. This relationship can be seen in FIGS. 5 and 6. The mechanisms for bending the wires are shown in FIGS.18, 19 and 20.

Figure 7:
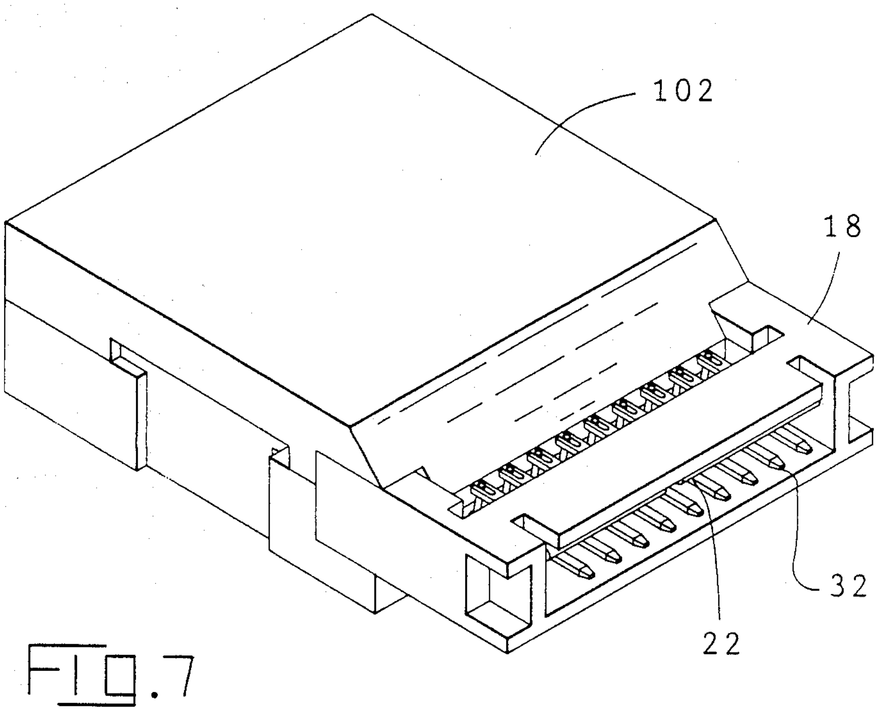
FIG. 7 is an isometric showing similar to FIG. 6 but illustrating the cable end attached to the connector body.
Figure 6:
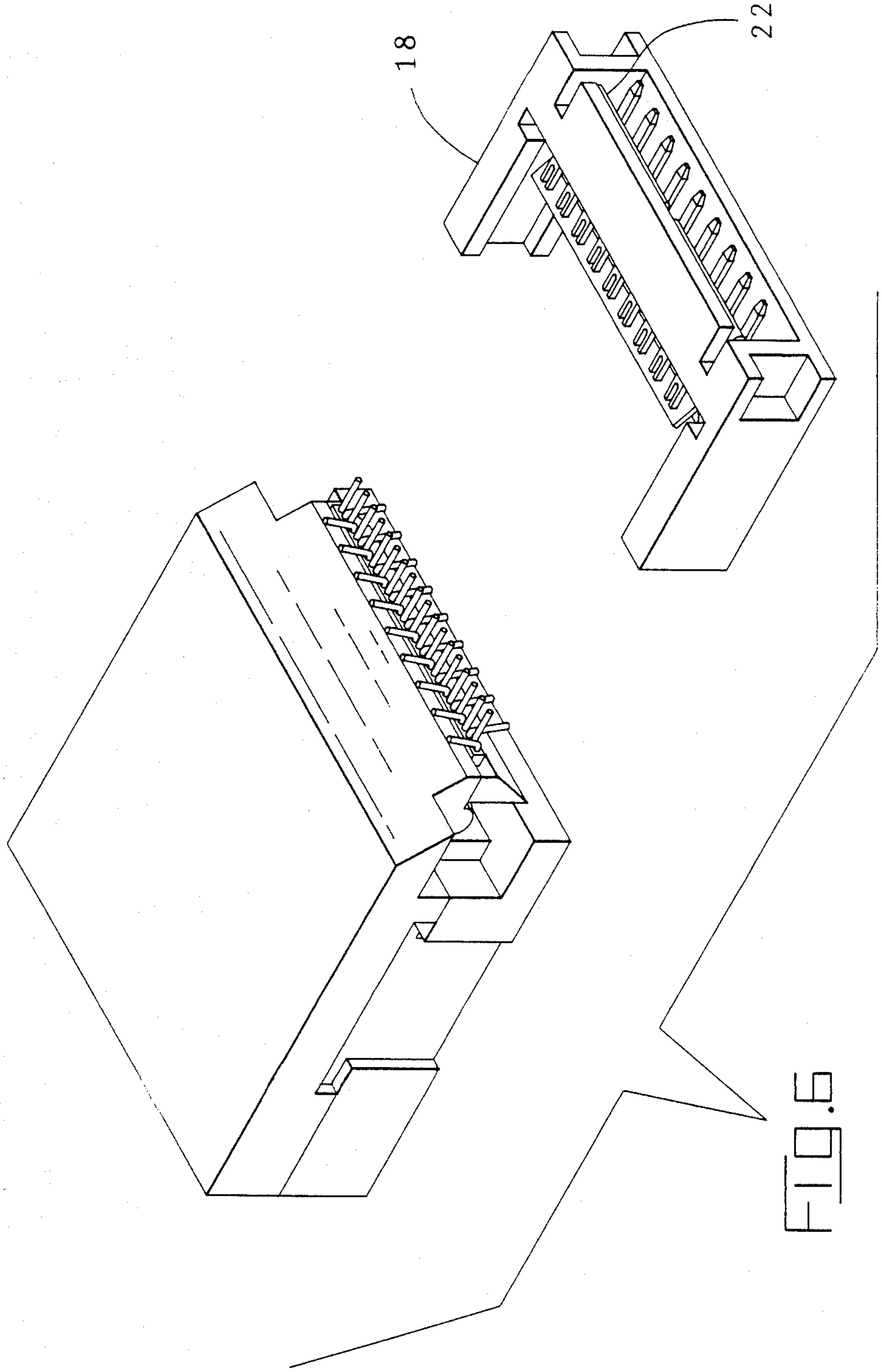
FIG. 6 is an exploded isometric showing similar to FIG. 5 but illustrating the prepared cable end with an aligned connector body.

Housing station E is the next following station. At this station, a preassembled cable connector housing is applied to the stripped and bent wires. The housing is fabricated of another molded, electrically insulating material and is removably positioned with respect to the guide member. The housing brings an electrically conductive ground bus and terminals into operative association with the wires of the cable end. FIG. 6 illustrates the housing with its terminals and ground bus aligned with the cable end and guide member prior to their coupling. FIG. 7 illustrates the housing coupled to the guide member and wires. FIGS. 22 through 26 illustrate the mechanisms for coupling the housing to the wires of the cable end.

Figure 14:
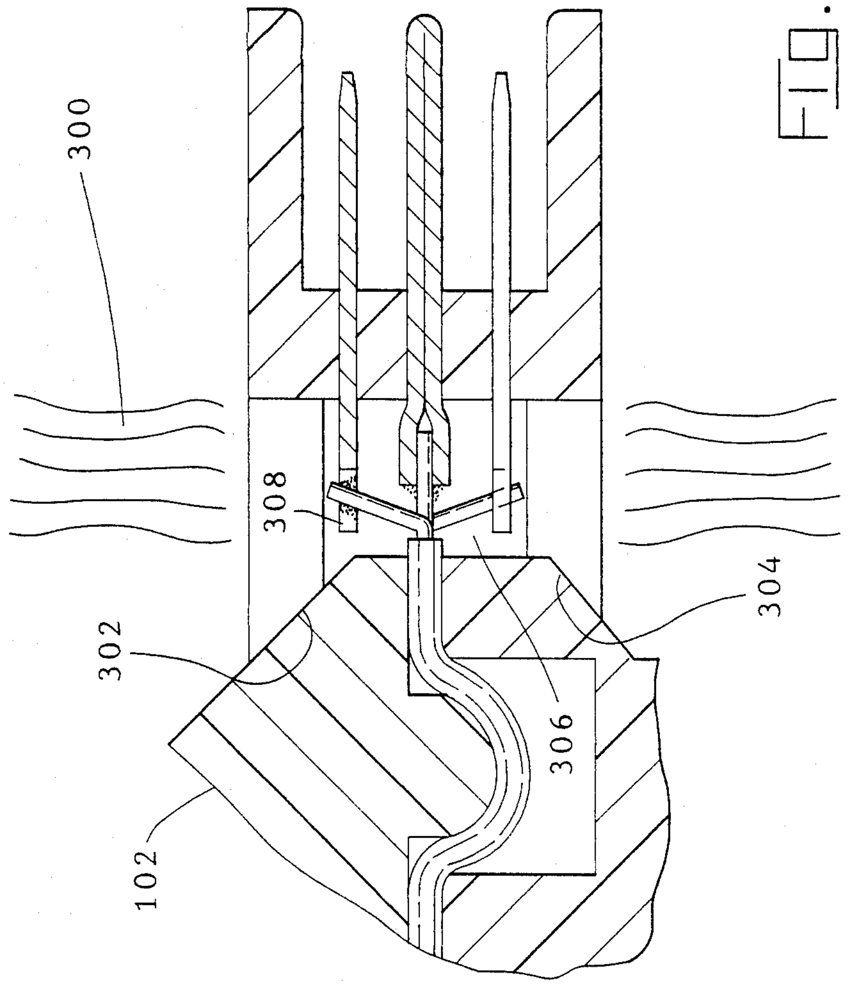

The permanent attaching of the wires of the cable end to the terminals of the housing is effected at Station F, the soldering station. This station is shown in FIG. 14.

The guide member is removed at Station G, the guide member removal station. Since the housing has been permanently attached in proper orientation with respect to the cable end, no need remains for a guide member to position the cable end for subsequent operations.

Figure 15:
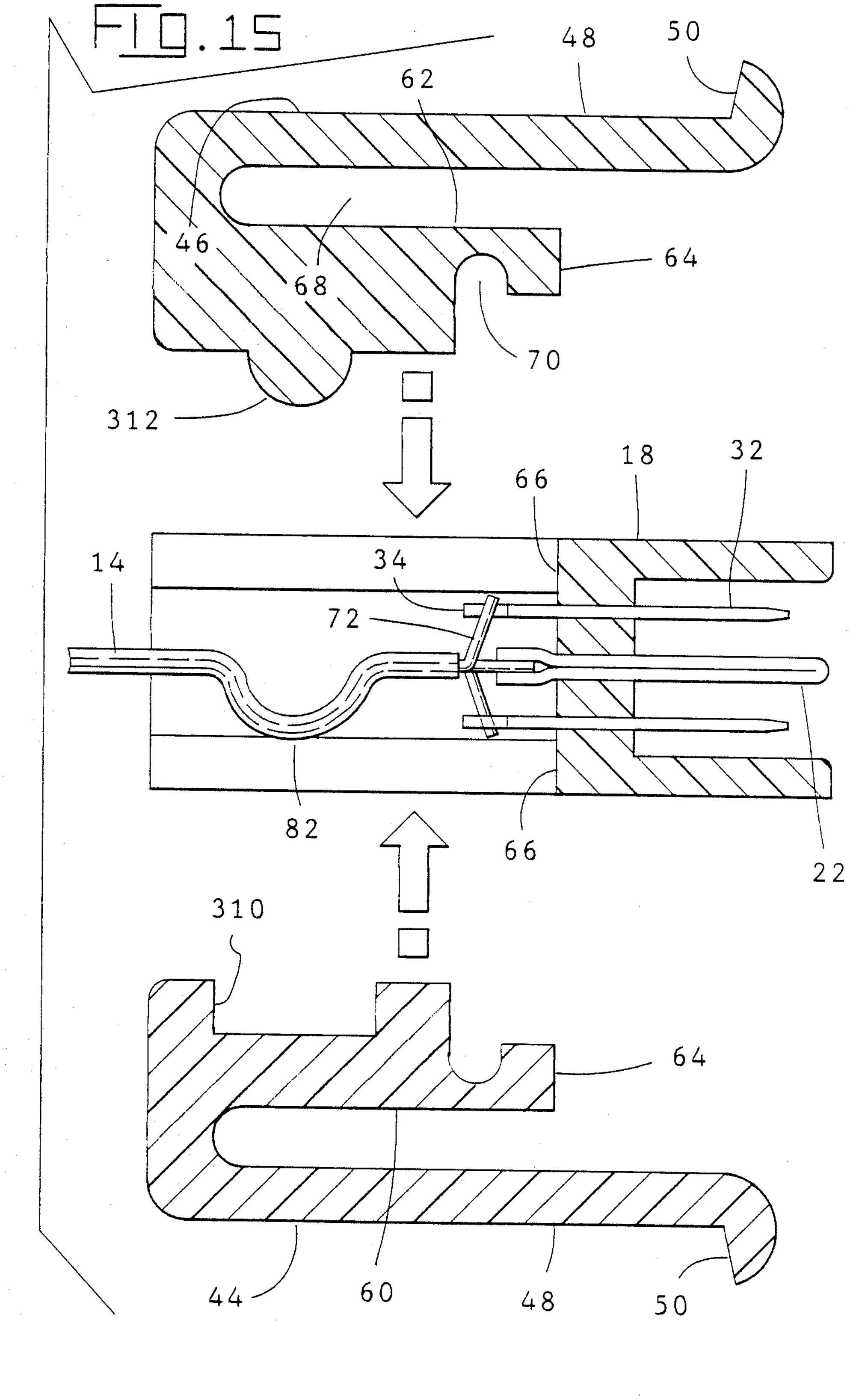
Figure 16:
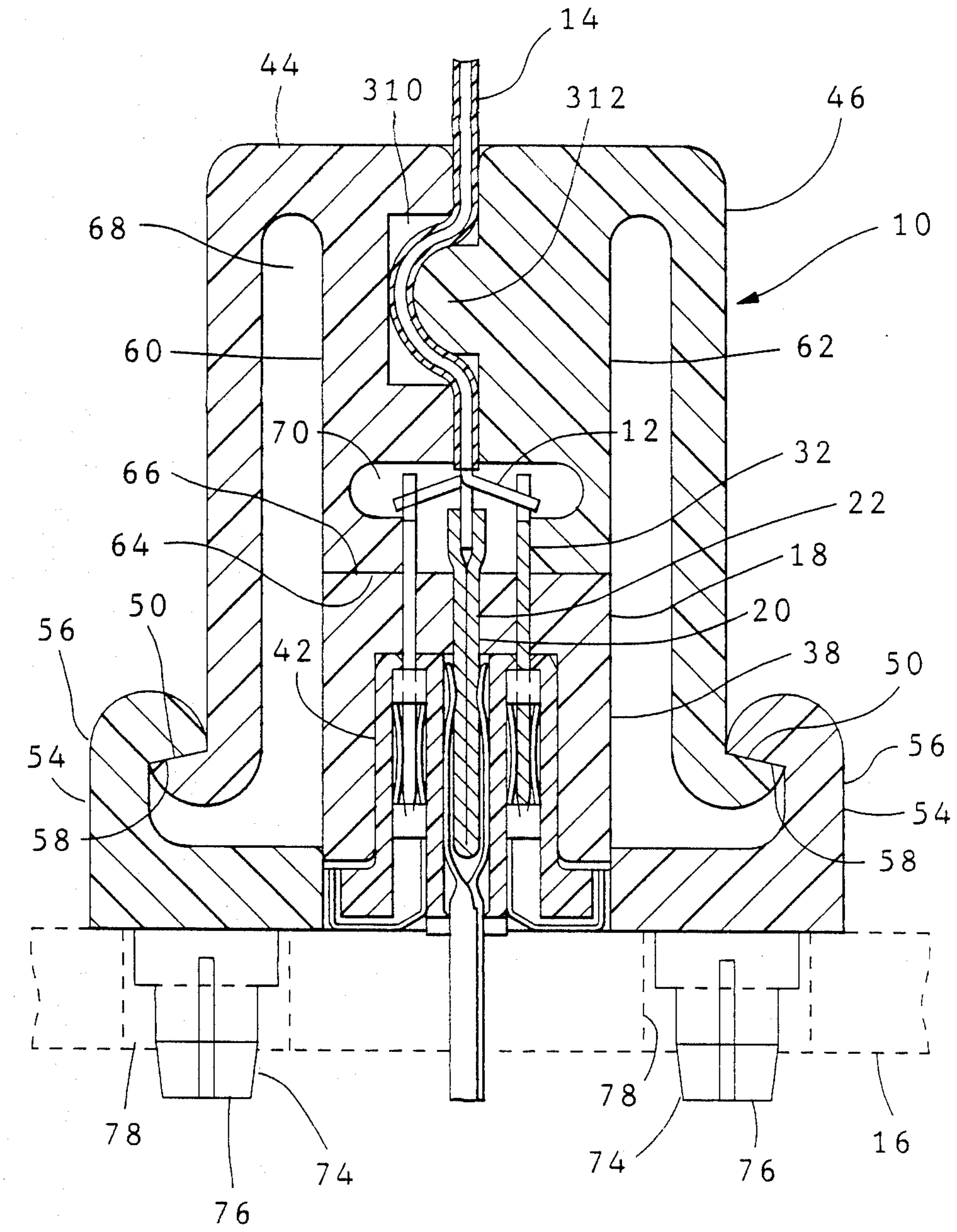
FIG. 16 is a cross-sectional view of the completely assembled cable end and connector shown mated and coupled with a printed circuit board.
Figure 17:
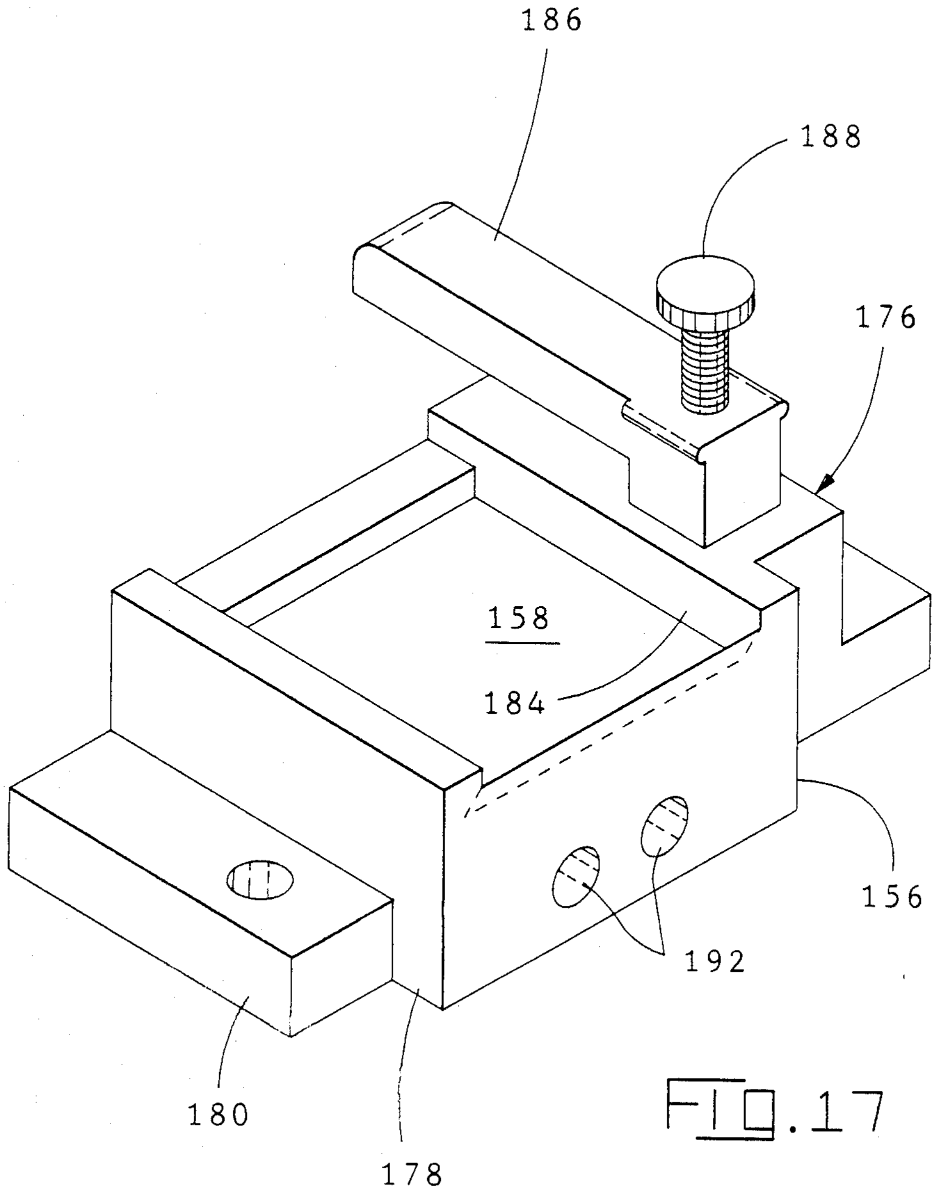
FIG. 17 is an isometric showing of the positioning component for the cable end and guide member used in conjunction with the wire bending and attaching mechanism.

The final station in the process is Station H, the cover station. The cover station applies the coupling components to the housing and cable end for creating the final product, a cable end with appropriate connector components attached thereto whereby the connector, with its attached cable end wires, may be removably coupled to an appropriate electronic machine. FIG. 15 illustrates the cover halves aligned with the housing for securement thereto. FIG. 16 is a sectional view of the cover halves secured with respect to the housing, with the housing supporting the signal contacts and ground bus, and with the signal contacts and ground bus attached to the wires of the cable end, all secured for coupling to a circuit board of an electronic machine.

Connector

Figure 11:
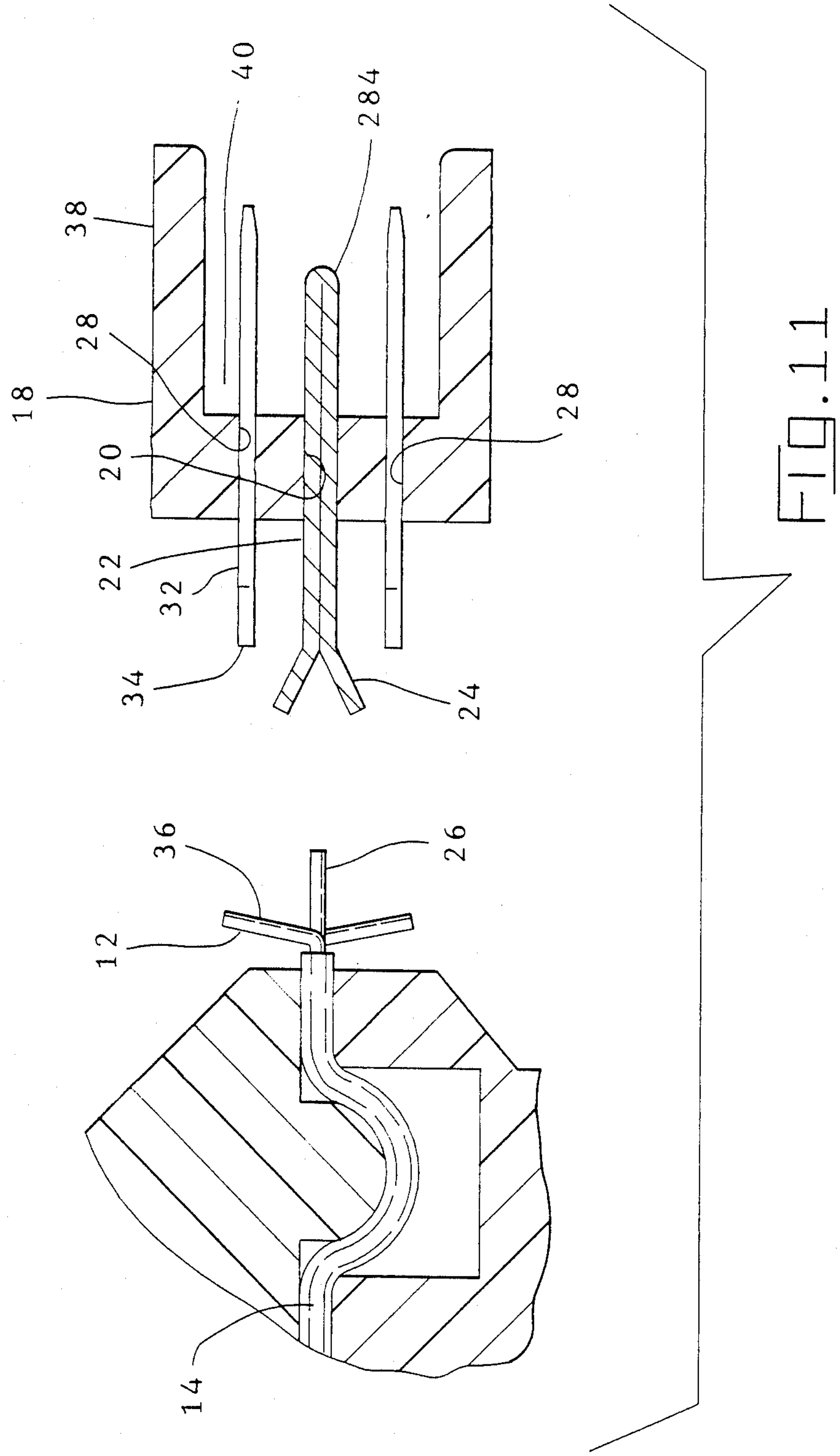

The connector 10 is best seen in FIG. 16, with parts shown in FIGS. 11 and 15. It is adapted, in the described preferred embodiment, to couple stripped electrically conductive wires 12 of a ribbon cable 14 with the traces of a printed circuit board 16. The connector comprises a housing 18 formed with a longitudinal central slot 20. The slot receives an elongated electrically conductive ground bus 22, the upper end 24 of which receives stripped ground wires 26 of the ribbon cable. The housing 18 has a longitudinal central plane extending through the slot 20 and the bus 22. A plurality of parallel apertures 28 are formed in the housing on opposite sides of the central slot. The apertures receive signal contacts 32, the upper ends 34 of which receive stripped signal wires 36 of the ribbon cable.

The housing 18 of the connector also has downwardly extending legs 38 defining an opening 40 which receives the mating connector 42. The connector also comprises front and rear cover halves 44 and 46 coupleable between the housing 18 and the printed circuit board 16 and adapted to receive and support therebetween the ribbon cable 14 above its stripped wires 12. Each cover half includes a downwardly projecting first leg 48 with a horizontal, upwardly facing ledge 50.

The connector further includes a pair of side latches 54 which couple with the printed circuit board 16. Each side latch has an upwardly projecting leg 56 with a horizontal, downwardly facing ledge 58 for receiving an upwardly facing ledge 50 of the cover halves for coupling the cover halves 44 and 46 and the housing 18 with respect to the side latches 54 and the printed circuit board 16. Each cover half has a downwardly projecting second leg 60 and 62 located on opposite sides of the longitudinal central plane of the connector and interiorly of the first legs 48. Each second leg 60 and 62 has a lower surface 64 positionable upon an internal upper surface 66 of the housing 18.

The connector further includes a space 68 between each first leg and its adjacent second leg to allow each first leg to be moved interiorly toward the second legs for the coupling and uncoupling of the cover halves and the housing with respect to the side latches and printed circuit board. The connector further includes internal recesses 70 in the cover halves facing away from the longitudinal central plane of the connector for receiving the upper portions 34 of the signal contacts 32 and the ground bus 22 as well as the lower portions 72 of the stripped wires 36 of the ribbon cable. Lastly, the connector includes projections 74 associated with the side latches 54 to couple the side latches to a printed circuit board 16. The projections include a button extending downwardly from each side latch. Each button has a cutout 76 to facilitate its contraction and expansion and consequently, its insertion into, its retention in, and its removal from, a hole 78 in a printed circuit board.

Forming And Trimming Station A

As particularly, the forming and trimming station A is designed to configure the ends of the cable 14 with a permanent formed arcuate portion 82 at a predetermined distance from the trimmed end 84. It has been found that the most accurately prepared cable end can be done by first securely holding a part of a ribbon cable in a fixed orientation with respect to knives or blades 86. The central axis of the cable is located perpendicularly with respect to both the edges of the knives and the planes in which they reciprocate for cutting purposes. The edges of the knives 86 are adapted to move equally and oppositely toward and away from the plane of the held cable. The movement of the knives is such that the coacting blades will move together to concurrently contact the opposite faces of the cable at the insulation 88 and will continue their movement meeting at the central plane of the cable where the blades contact each other. In this manner, there will be no pinching or bending at the cut ends of the cable since the cable end is effectively pinched off.

Prior to stripping, the blades 86 are held in their retracted position and the cable 14, adjacent its free end 84, is placed in a vice-like fixture 90. At this fixture, a permanent deformation 82, curved in an arcuate configuration, is formed in the cable perpendicular to the central longitudinal axis of the cable at a precise, predetermined distance from the cable end. The forming of the cable may be effected by hand but is preferably effected by commercially available forming equipment manufactured by Carpenter Manufacturing Company of Manlius, N.Y., modified for the particular function. The formed portion of the cable is preferably bent in the shape of a semicircle extending upwardly from the face and central longitudinal plane of the cable. The precise size and positioning of the formed portion of the cable with respect to the cut end of the cable is very important if the subsequent steps are to be accurately performed at the subsequent stations.

The fixture 90 is provided with an upper block 92 and a lower block 94. These blocks are provided with coupling mechanisms for their precise mating with each other. One of the blocks is provided with a recess 96, while the other block is provided with a projection 98. The block and recess are located in an operational relationship for receiving the bend of the cable and maintaining it in a fixed predetermined position so that the accurate trimming may be effected.

The bend in the cable is sufficiently permanent that it may be utilized for locating the cable in a precise position with respect to a guide member 102 for subsequent processing. The curved portion will remain in the cable during normal handling due to the physical characteristics of the cable.

Guide Member Station B

Figure 2:
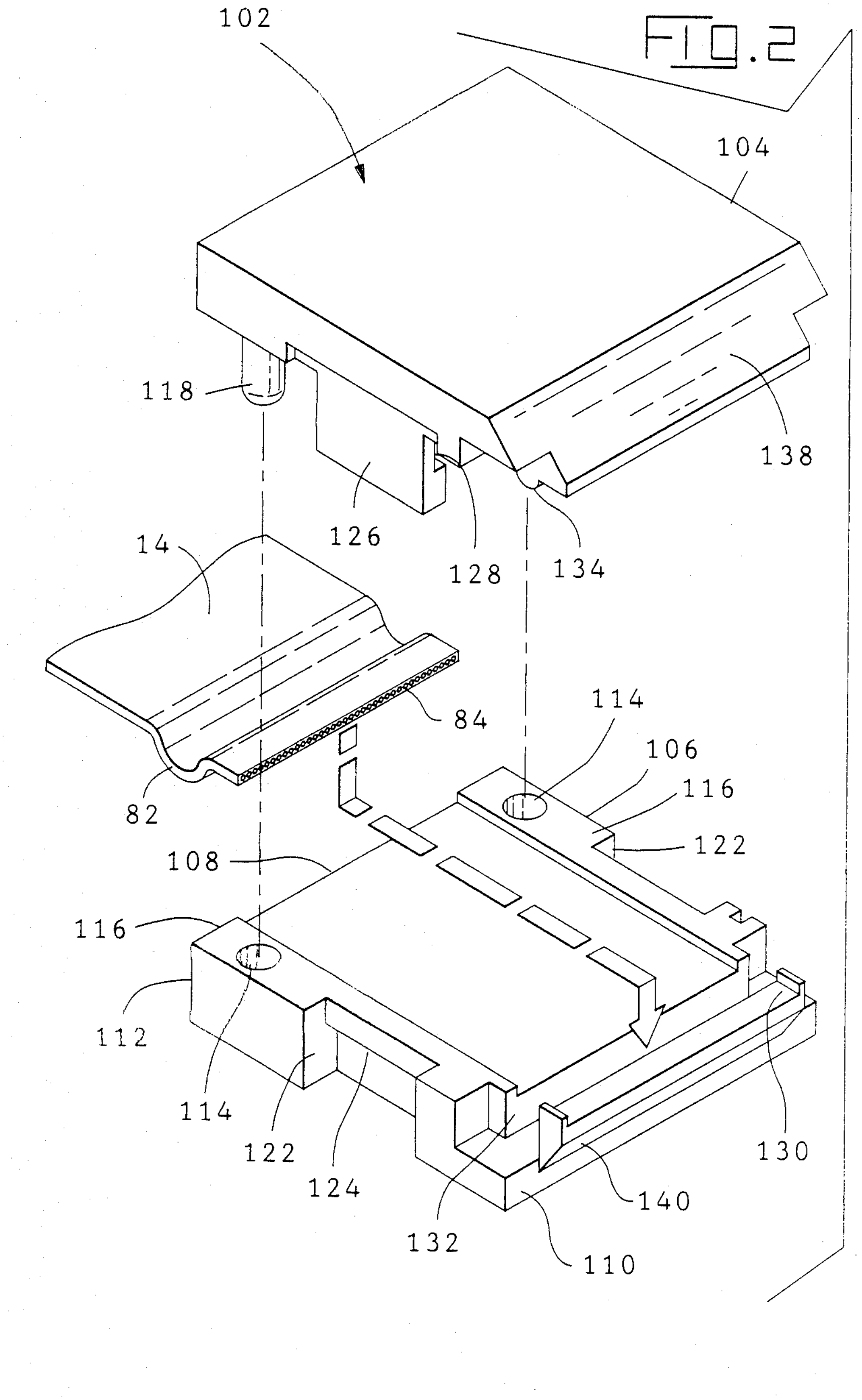
FIG. 2 is an exploded isometric showing of the stripped and trimmed cable end and the guide member which will control the cable end through successive processing steps and mechanisms.

The guide member station B is that station wherein the guide member 102 is precisely positioned on the end of the cable 14 for accommodating the majority of the subsequent processing steps. The guide member, in position adjacent to the end of the cable, is seen in FIG. 3. FIG. 2, however, is an exploded perspective illustration showing the two constituent parts 104 and 106 of the guide member as well as the trimmed and formed cable 14 to be coupled therebetween. The guide member is formed of mating upper 104 and lower 106 parts accurately machined for securing the cable 14 with respect thereto with the formed part 82 of the cable 14 and its trimmed end 84 in a particularly predetermined orientation.

The lower part or base 106 of the guide member is generally flat with a recessed area 108 extending essentially from front 110 to rear 112. The recess is of a depth equal to the thickness of the cable for effecting its receipt during operation and use. Its width is substantially equal to the width of the cable. The base 106 includes alignment holes 114 in its enlarged edges 116 for the receipt of mating posts 118 depending from the upper portion 104 of the guide member. The posts 118 and holes 114 of the guide member are in mating pairs on opposite side edges of the upper and lower edges of the guide member parts.

The central extent of the lower part of the guide member has a recess 122 along each edge, each edge having a shoulder 124, for receiving and aligning a mating latch 126 located and depending from each edge of the upper part 104. In this manner, a surface on the shoulder 128 of each latch may mate with a shoulder 124 on each edge of the recess for securely coupling the upper part 104 and base 106 of the guide members into appropriate position. The latches 126 may be moved outwardly to effect separation of the parts 104 and 106 of the guide member for inserting or removing the cable 14 from the guide member 102. The forward end 110 of the lower part has a minor recess 130 which is essentially an extension of the major recess 108. Therebetween is a cavity 132 for receiving the downwardly formed portion 82 of the cable. The majority of the cable between the formed portion 82 and the trimmed end 84 is received within the minor recess 130. A semicircular projection 134, of a size and shape to be received within the formed portion 82 of the cable, depends downwardly into the formed portion 82 of the cable and into the cavity 132 between the major and minor recesses 108 and 130. In this manner, the cable 14 may be positioned on the base 106 with its formed portion 82 in the cavity 132 and the guide member 102 mounted onto the base 106 with depending posts 118 located in the holes 114 whereby the semicylindrical portion 134 of the upper part 104 will properly position the formed part 82 of the cable 14 including the cable end 84 extending forwardly of the guide member 102 in anticipation of the stripping step to be performed at Station C.

The front end 110 of the guide member 102 is provided with beveled edges 138 and 140. These edges are at an inclined angle with respect to the front edge 110 of the guide member 102 as well as with respect to the plane of the ribbon cable. The angle utilized is about 45 degrees and it is adapted to facilitate the precise locating of the cable end and guide with respect to the subsequent processing stations which, in turn, are provided with mating beveled edges to accommodate the precise positioning therebetween.

Stripping Station C

Figure 4:
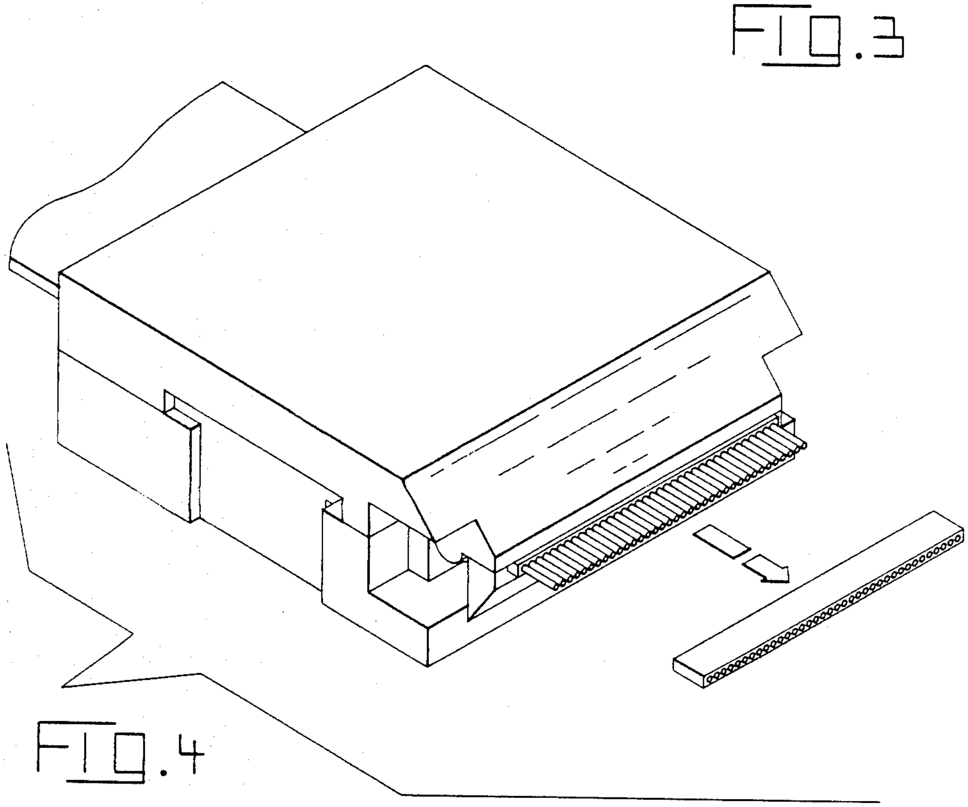
FIG. 4 is an isometric showing similar to FIG. 3 illustrating the cable end being stripped of its insulation.
Figure 10:
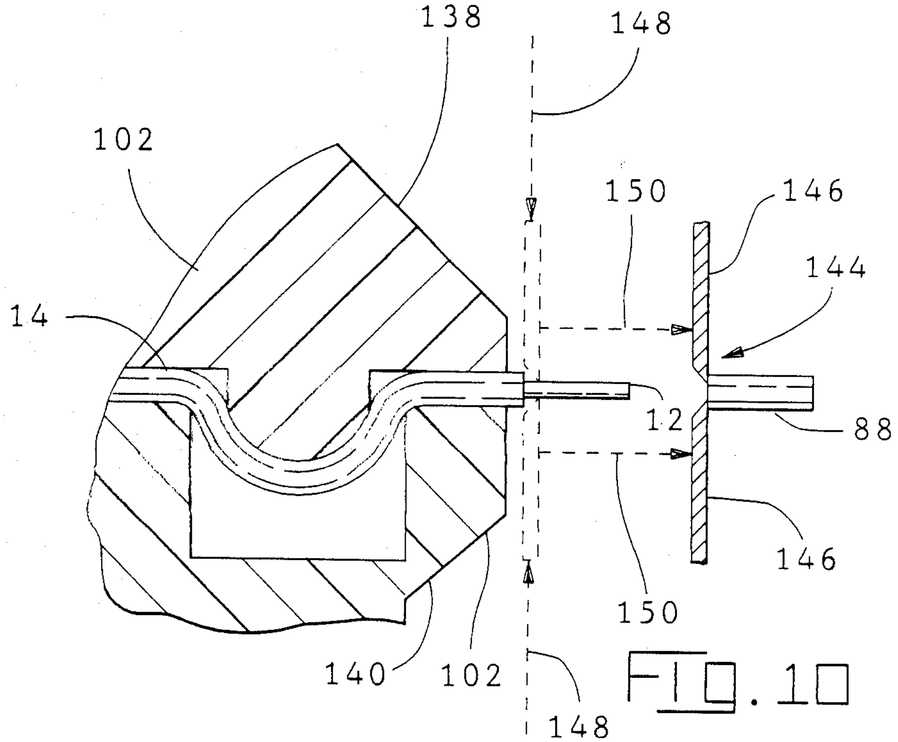
Figure 9:
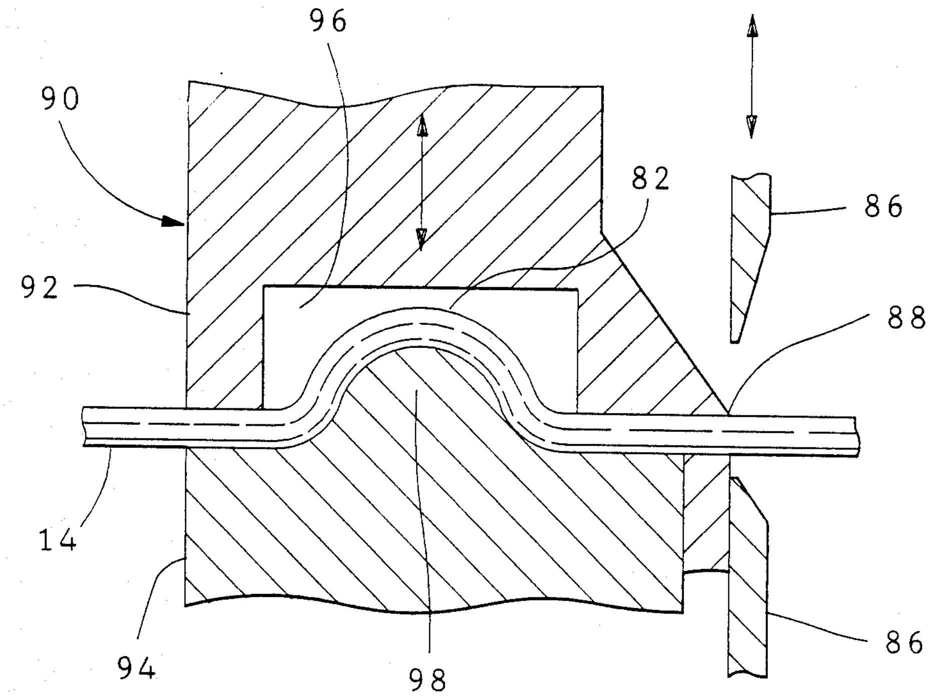

The results of the stripping operation at Station C can most readily be understood by reference to FIGS. 4, 9 and 10. Stripping is effected by a cutting mechanism 144 similar to that employed at the trimming station discussed hereinabove. The motion of the cutting blades 146 of the stripper are adapted to move concurrently toward and away from the insulation 88 of the cable to be trimmed in a plane perpendicular to the central horizontal plane of the ribbon cable 14. When moved together toward opposite faces of the cable exposed through the guide member 102, the blades 146 will concurrently contact the insulation 88 and continue their movement toward the central horizontal plane of the cable. Note arrows 148. Unlike the action of the trimmer, however, where blade movement continues through the wires, the blades 146 of stripping station C stop their movement just as their cutting edges contact the wires 12. Note the dotted line showing of blades 146 in FIG. 10. At this stage, the bulk of the insulation material surrounding the wires has been cut. The insulation between the wires remains. Thereafter, movement of the blades 146 away from the guide member 102 and cable 14 in the plane of the cable will rip the remainder or uncut regions of the insulation away from the wires. Note arrows 150 of FIG. 10. The insulation 88 may then be discarded or reprocessed. The end of the cable with its trimmed wires is now ready for being transported to the next subsequent station. The guide member 102 and trimmed cable end 84 may be held by hand in proper position within the stripping station for stripping to a predetermined extent but this function is preferably effected by commercially available supporting equipment manufactured by Carpenter Manufacturing Company of Manlius, N.Y., modified for the particular function. Such stripping mechanism would be provided with mating beveled edges for receiving the beveled edges 138 and 140 of the guide member to ensure proper positioning therebetween.

Bending Station D

At the fourth station, Bending Station D, appropriately trimmed wires are bent in anticipation of being coupled with the housing 18. To insure that the stripped wire ends are precisely positioned, a wire aligning template may be used prior to bending the wire ends. Every other wire is bent for functioning as a signal wire 36 for transmitting current. The wires between the bent wires are not bent and constitute the ground wires 26. Alternate signal wires 36 are preferably bent in opposite directions. Note FIGS. 5 and 11. The mechanisms for bending the wires are shown in FIGS. 17, 18, 19 and 20.

The bending fixture 154 includes apparatus for bending selected, individual, stripped, electrical wires at the free end of the ribbon cable 14. The apparatus includes a base 156 having a recess 158. The apparatus also includes fixed components 160 within the recess to individually position the stripped wires of a received ribbon cable parallel with respect to each other. The fixed components include tall positioning shims 162 with notches 164 extending downwardly from their upper edges to contact a ribbon cable between its stripped wires and to properly position the web of insulating material and the stripped wires with respect to the fixed components. The fixed components also include short ground wire shims 166 located between some of the tall positioning shims 162 to receive, thereadjacent, the ground wires 26 of the received ribbon cable 14. The fixed components 160 also include short signal wire shims 168 located between others of the tall positioning shims 162 to receive, thereadjacent, the signal wires of the received ribbon cable. The apparatus further includes bending fingers 170 operatively associated with the fixed components for reciprocable movement with respect to the fixed components. The bending fingers are located in two rows on opposite sides of the wires to be bent. The bending fingers move from retracted positions on opposite sides of the wires to be bent, to advanced positions wherein the leading edges 172 of the bending fingers may contact and bend selected, individual stripped signal wires of the ribbon cable supported and positioned by the fixed components.

The bending fixture as shown in FIGS. 18, 19 and 20 also includes motion-imparting mechanisms 174 and alignment features which are improvements over the bending fixture as described in copending application Ser. No. 040,510 filed Apr. 20, 1987. The bending fixture also includes a positioning subassembly 176 formed of a base 178 with apertured flanges 180 and bolts 182 for securing the subassembly to a work surface, not shown. The subassembly is also provided with a recess 184 of a size and position to receive the guide member 102 with its prepared cable end. A top clamp 186 with a tightening nut 188 releaseably secures the guide member 102 and cable end in proper orientation within the subassembly 176. Also located in the positioning subassembly are a pair of guide bar apertures 192 sized and spaced for receiving guide bars 194 extending forwardly from the bending fixture 154. In this manner, the bending fixture may be accurately slid into position with respect to the guide block until contact is made. At this time, the bending fixture is appropriately positioned with respect to the subassembly and stripped wires to effect the bending of the signal wires of the cable end.

The beveled edges 138 and 140 cooperative with mating beveled edges 142 and 144 of the bending fixture 154 to further assure precise location between the stripped wires and the operating mechanisms.

Motion is imparted to the operating components of the bending fixture through scissor-like handles 196 and 198 having their ends remote from the handles formed with slots 202 for receiving the bars 204 upon which the bending fingers are located. The bending fingers are provided with apertures 206 with spacers 208 to ensure coupling of the bending fingers with respect to the bars 204 for effecting the proper operational movement.

Springs 210 on the exterior or handle ends of the scissor-like members return the handles 196 and 198 to their rest position after they have been contracted to bend wires. Pivoting of the handles is about an axis shaft 212 fixedly secured with respect to the bending fixture 154. In this manner, the bending elements always rest in an orientation to effect the desired bending function.

Figures 21, 21A:
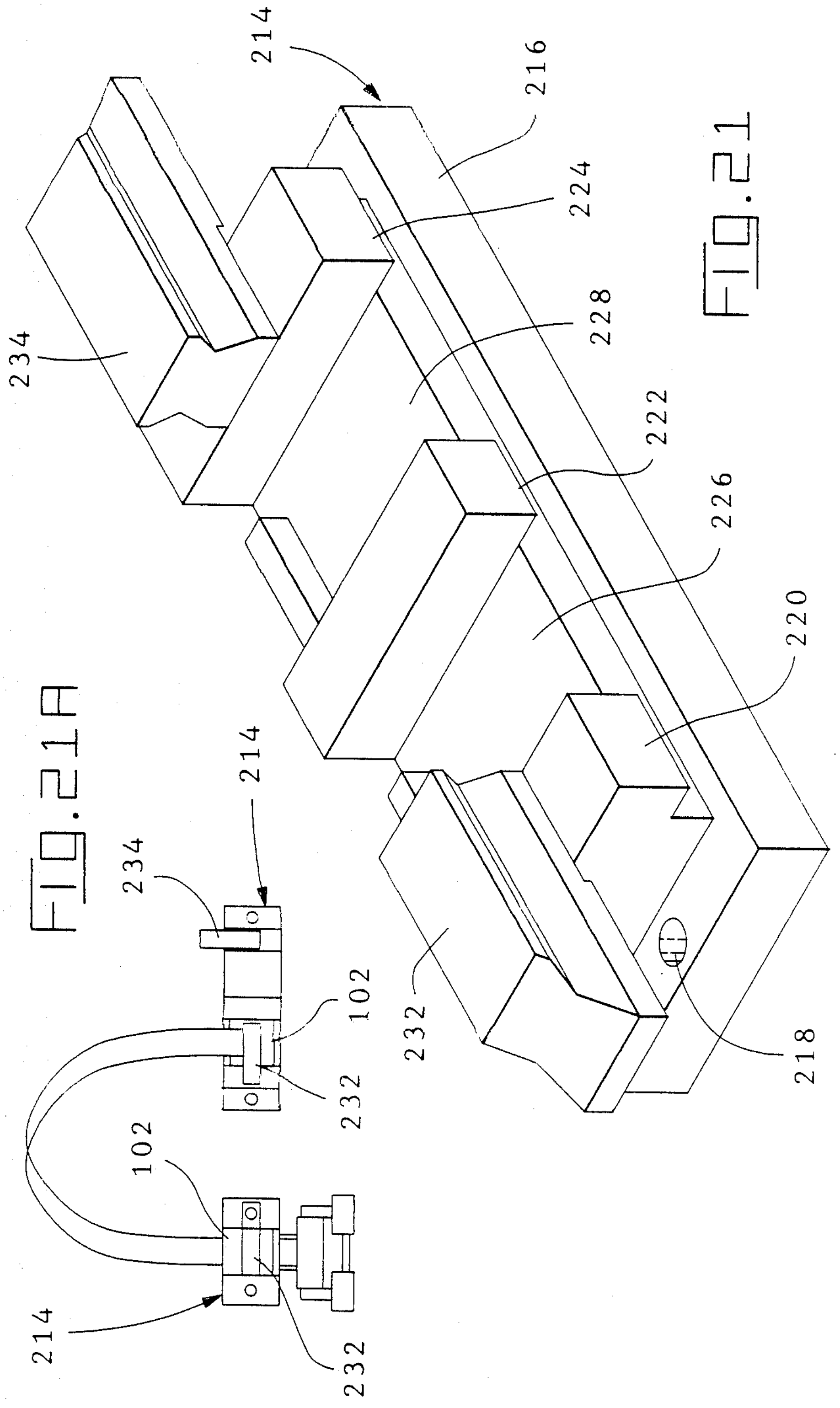
FIG. 21 is an isometric showing of a holding fixture which may be used during the performing of the herein-described assembly steps to position and protect the opposite end of the cable.
FIG. 21A is a diagramatic top plan view illustrating the manner in which the holding fixture of FIG. 21 would be used.
Figure 22:
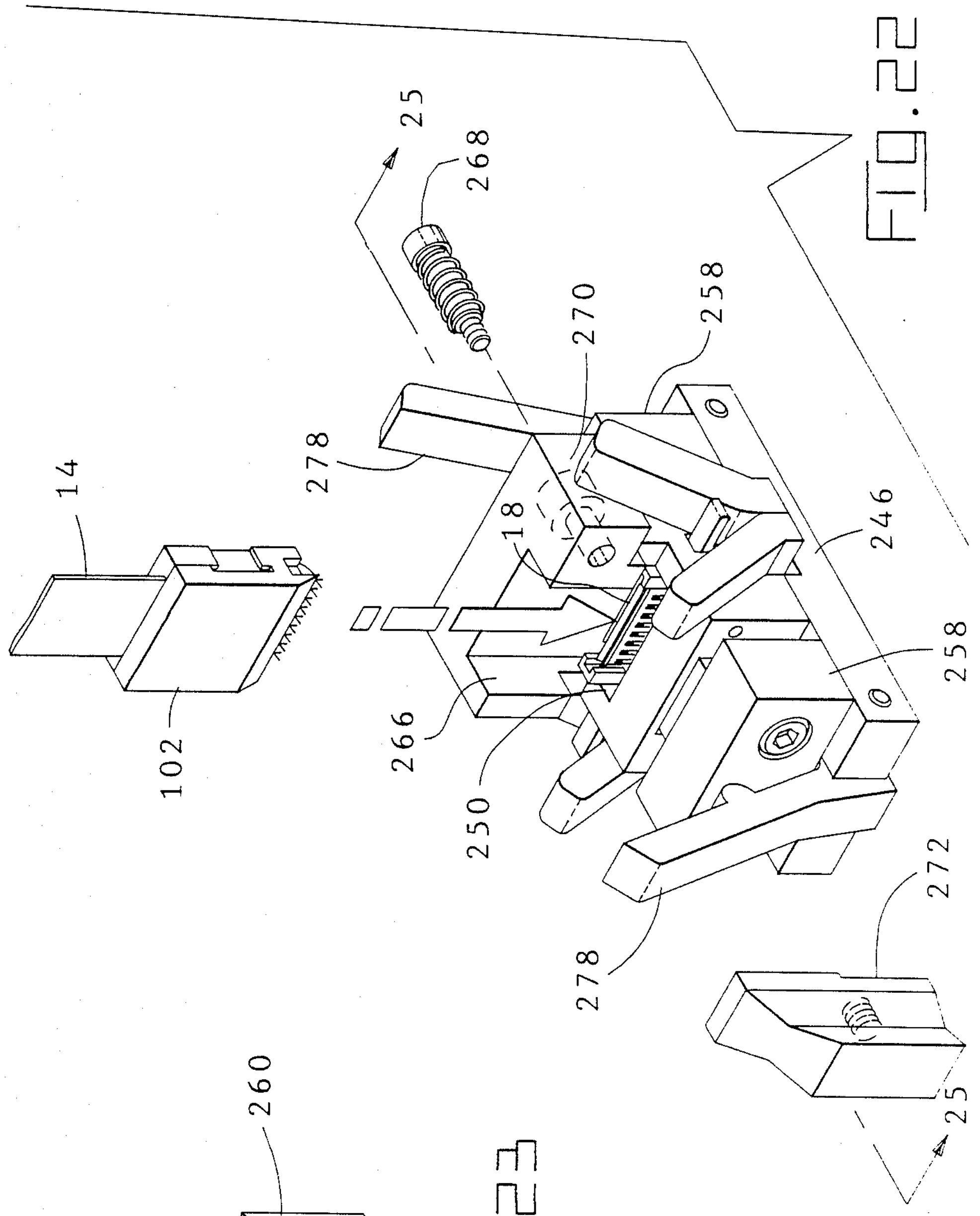
FIG. 22 is an exploded isometric showing of the connector attaching mechanism used to couple the cable end to a connector housing.

Shown in FIGS. 21 and 21A is a fixture 214 which may be utilized if desired and which would function as an idling station for securing that free end of a ribbon cable which is not being terminated as described herein. In other words, as one free end of the ribbon cable is being formed, trimmed, stripped, bent and attached, the opposite end of the ribbon cable is preferably held in the fixture disclosed in FIGS. 21 and 21A so that it does not become inadvertently positioned to encumber the operational steps intended to be performed. To this end, the fixture includes a base plate 216 bolted to a work surface through end apertures 218 in the base plate. Upstanding blocks 220, 222, 224 are spaced so as to define recesses 226 and 228 therebetween. Above the outermost blocks 220 and 224 are pivotal securement members 232 and 234 rotatable from inoperative positions as shown in FIG. 21 to the operative position as shown in the left side of FIG. 21A wherein their free ends rest upon the central block. In their FIG. 21 position, the securement members allow for the inserting or removing of one or more cable ends mounted in guide members. In the FIG. 21A positions, the securement members hold the guide member 102 in an intended locked position remote from the terminating station functioning upon the opposite end of the ribbon cable.

Housing Station E

Figure 12:
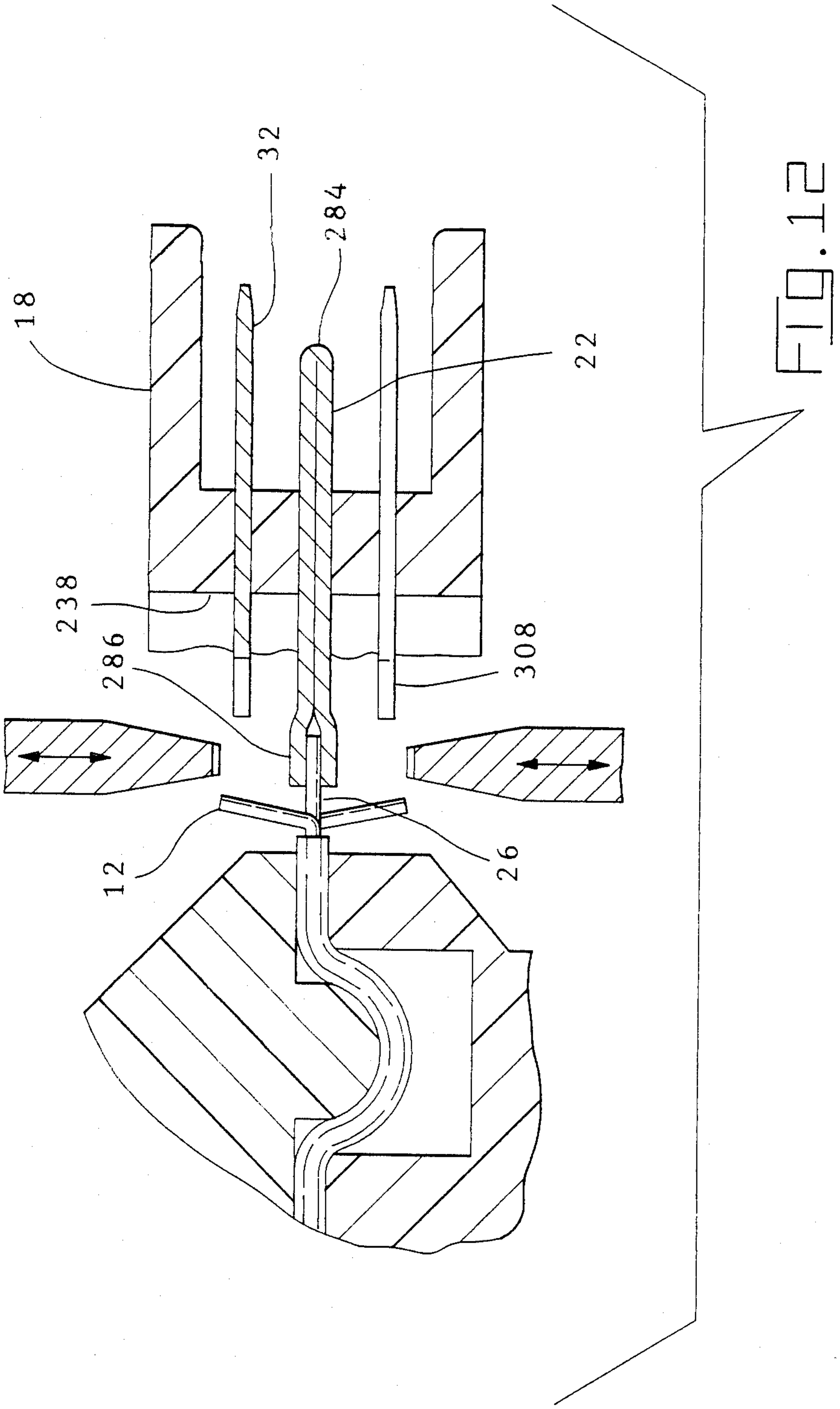
Figure 13:
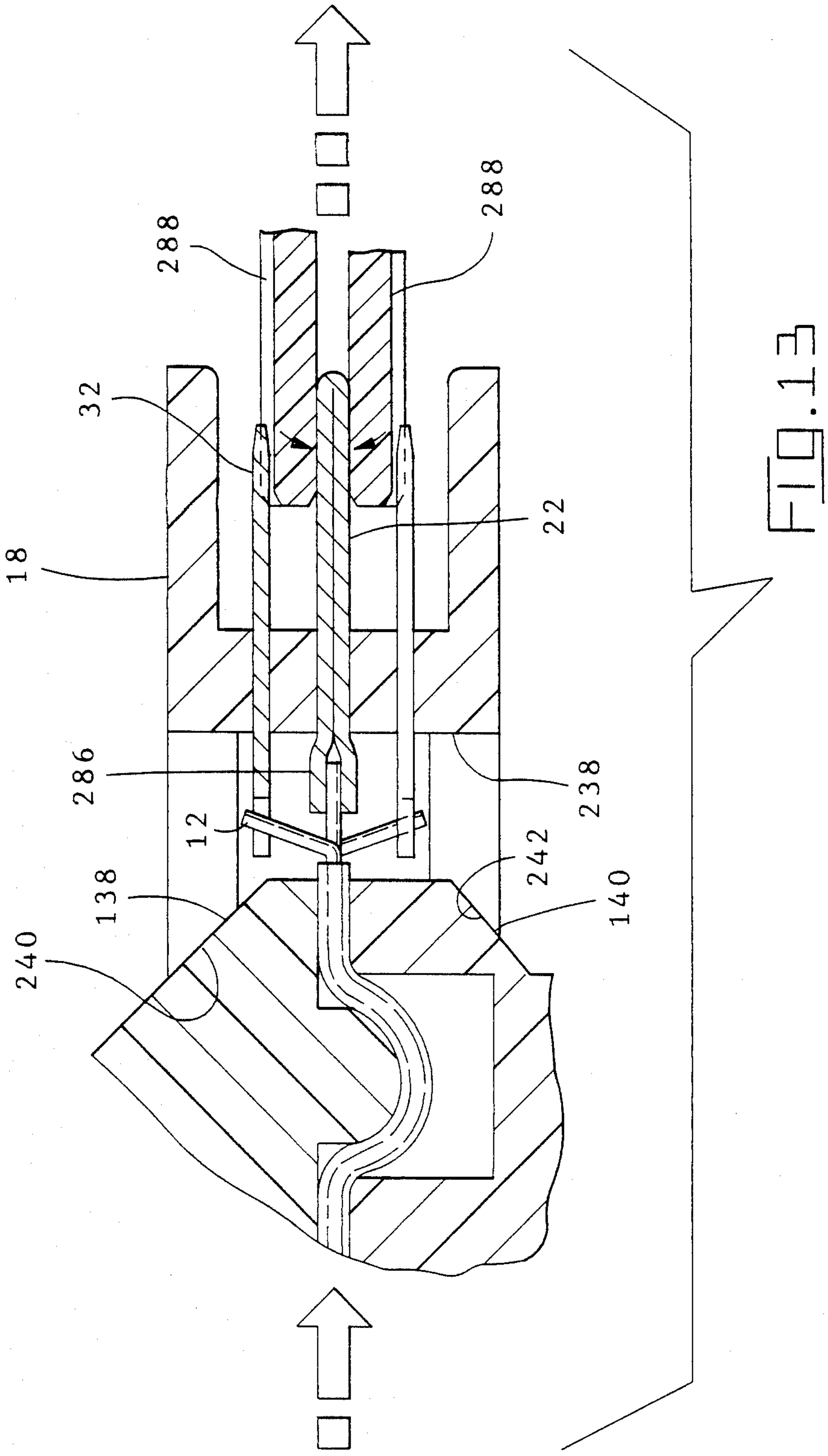

The housing station E is adapted to couple the housing 18 of the connector 10 to the stripped end of the cable 14 with its bent signal wires and unbent ground wires. The housing is best seen in FIGS. 6 and 7, perspective illustrations showing the housing 18 prior to attachment to the guide member 102 and cable ends 84 and coupled thereto respectively. FIGS. 22 through 26 show the apparatus for coupling the wires and the connector housing. FIGS. 11 through 13 show the housing 18, cable wires 12, ground bus 22 and signal contacts or terminals 32 and their relationship with each other as the apparatus for FIG. 22 through 26 act thereon.

FIGS. 11 through 13 show the housing 18, cable wires 12, ground bus 22 and signal terminals 32 in a horizontal orientation. This is the relationship in which such parts are preferably held for the bending operation as performed by the mechanisms shown in FIGS. 18, 19 and 20. The housing, cable wires, ground bus and signal terminals are preferably held in a vertical orientation as shown in FIG. 16 during the attaching step as with the mechanisms shown in FIGS. 21 through 25. It should be understood, however, that the connector housing with attached cables need not be operated on in the vertical orientation as shown in FIG. 16. It need not necessarily be supported in either the vertical or horizontal orientation during the various processing stations as herein described in the primary disclosed embodiment. Rather, the various terminating mechanisms could readily be utilized at any angular orientation including vertically or horizontally. The preferred orientations are merely described herein for the sake of convenience. The invention is not intended to be limited by such horizontal or vertical language since such language is employed for descriptive purposes only.

The connector housing 18 is an electrically insulating element, preferably molded with upper and lower plates and side support members and a cross-beam 238 adapted to support signal terminals 32 and a ground bus 22 or terminal in appropriate position with respect to each other and with respect to the stripped wires of the cable. The edge portions 240 and 242 of the housing are elongated and beveled for coupling with beveled edges 138 and 140 of the guide member 102. Details of construction as well as of coupling can be seen more readily in FIGS. 11 through 16 inclusive.

The apparatus of FIGS. 22 through 26 includes a base plate 246 normally locatable on a horizontal work surface. Secured upon the base is an upstanding fixed recipient block 248 with a central vertical slot 250 for receiving the connector housing 18 as well as the wires 12 of the cable end to be coupled. The recipient block 248 is also provided with circular, horizontal side apertures 252 for the receipt of guide rods 254 and return springs 256. The guide rods 254, two on each side, act to align shift blocks 258 in paths of motion toward and away from the connector housing and wires supported in the central recipient block.

Figure 23:
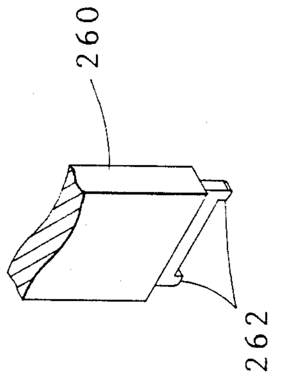
FIG. 23 is a perspective illustration of a connector inserting tool for positioning a connector into the connector attaching mechanisms.

A connector inserter tool 260, shown in FIG. 23, is provided with edge projections 262 to ensure that the connector is inserted the full distance into the slot 250 of the central fixed block 248. Extending upwardly from the central fixed block 248 is a guide member 264 with a recess 266 sized and positioned for receiving the guide member 102 and cable end 84 to ensure the positioning of the cable end in proper orientation with respect to the connector. A knurled bolt 268 extends through an aperture 270 of the upstanding block 264 to secure a mating guide member 272 in orientation with respect to the upstanding block for precluding movement of the guide member during the coupling of the housing to the wires.

Figure 25:
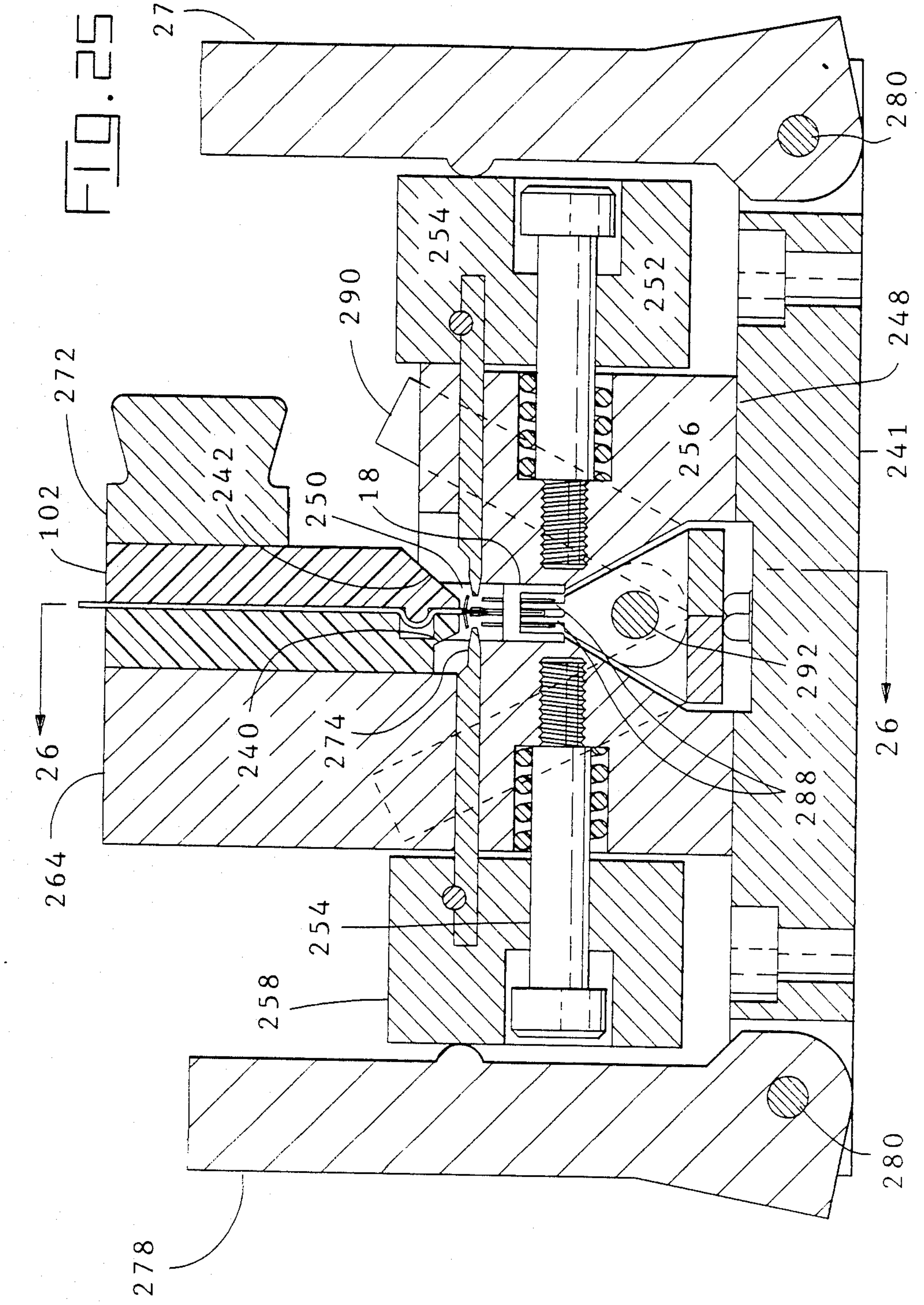
FIG. 25 is a sectional view taken along the lines 25—25 of FIG. 22 showing the internal components of the connector attaching mechanism.
Figure 26:
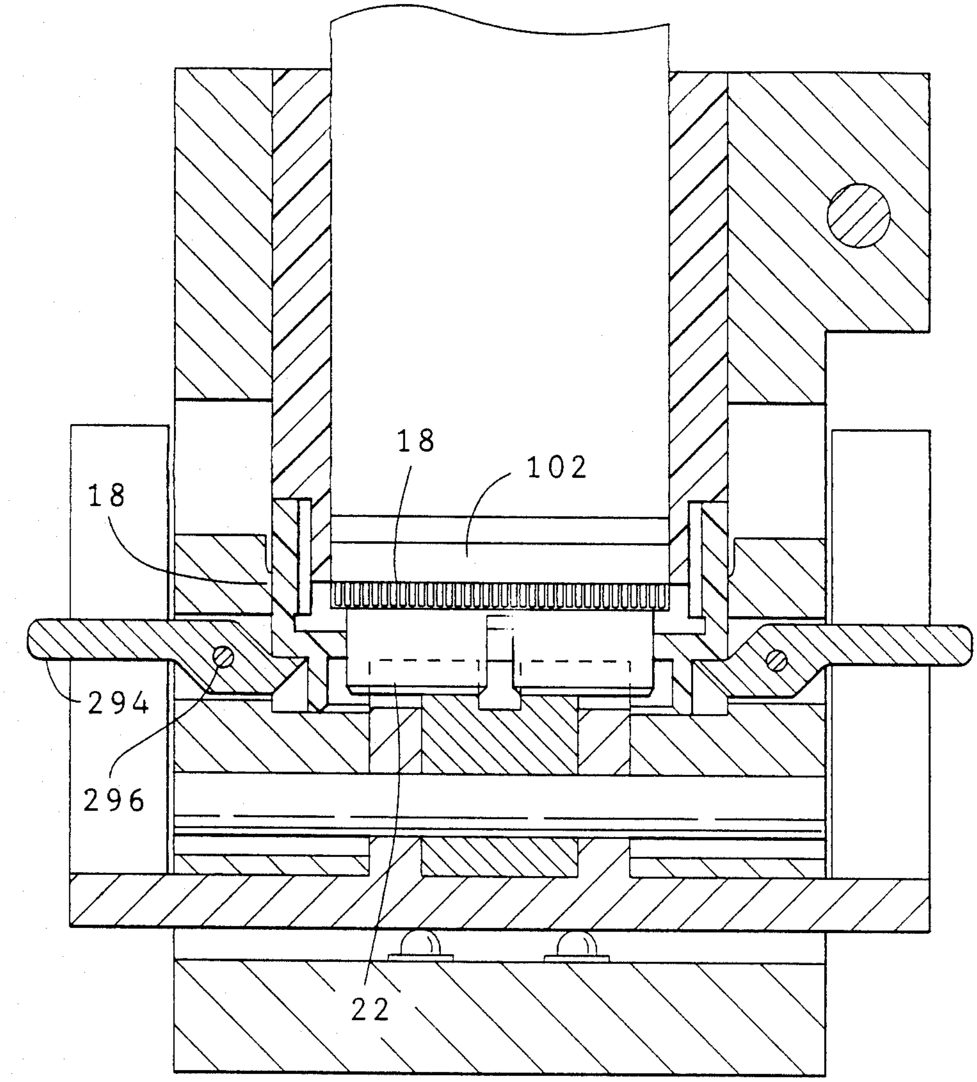
FIG. 26 is a sectional view taken along the lines 26—26 of FIG. 25 further showing the internal components of the connector attaching mechanism.

With the cable end and connector in proper orientation, relative to the crimping fingers as shown in FIGS. 13 and 25, crimping fingers 274, projecting inwardly from the slide blocks are urged toward each other through elongated horizontal slots 276 located in the upper extents of the recipient block. First or crimping handles 278 drive the slide blocks toward each other. The crimping handles are mounted in support rods 280 located in the base plate 246 for oscillatory motion. The crimping fingers 274 thus contact and compress the free edges of the bus and thereby mechanically secure the bus 22 to the ground wires 26. The crimping fingers are then moved outwardly away from the ground bus as shown in FIG. 12 through the action of the coil springs 256.

Figure 24:
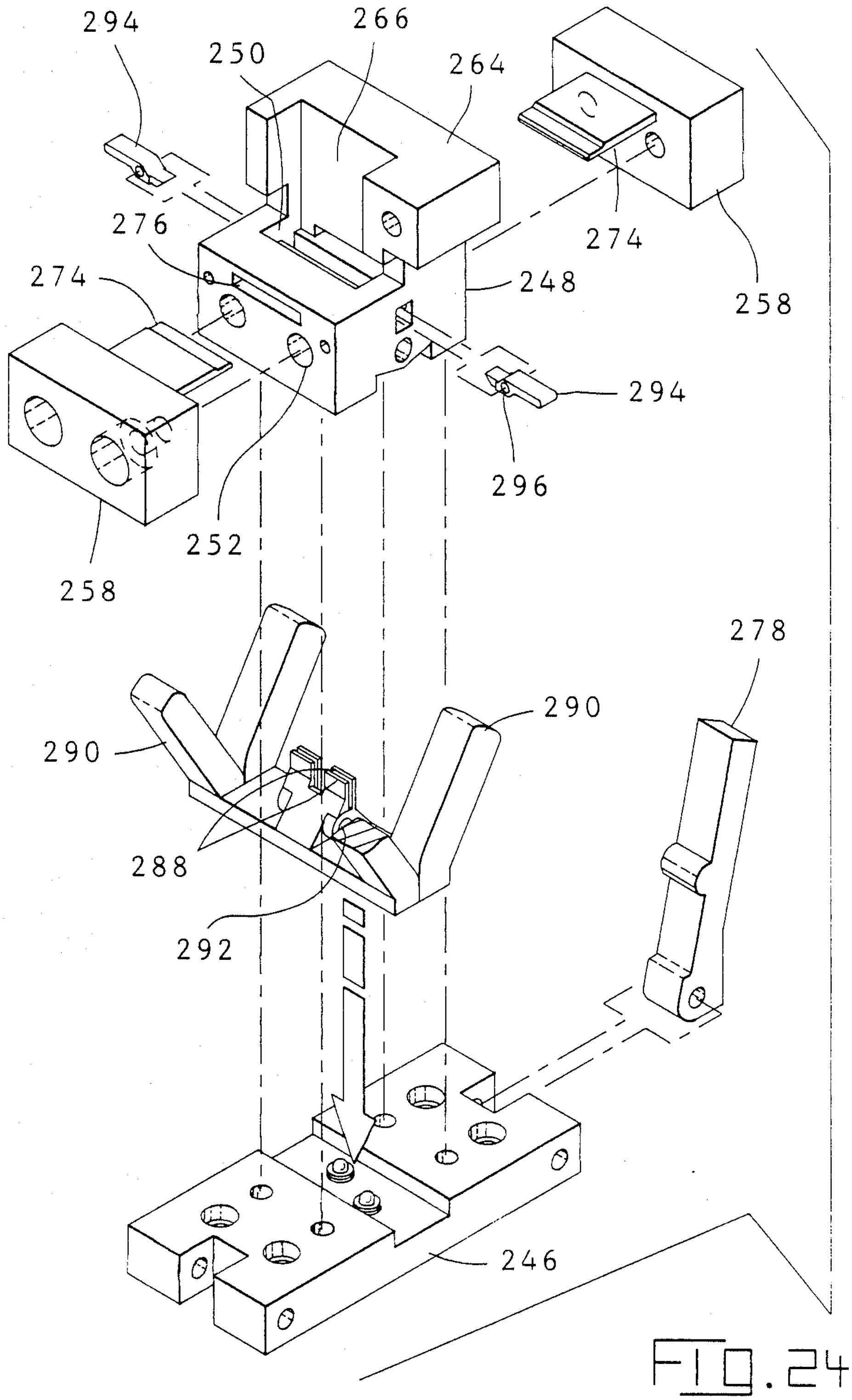
FIG. 24 is an exploded isometric showing of the device of FIG. 22 illustrating all of its respective parts.

When the connector housing is first coupled with the wires of the cable end, the bus bar 22 is located with its bight end 284 extending from the connector 10 a greater distance than in the final product. Crimping fingers 274 pinch the adjacent free ends 286 of the bus bar over the ground wires for their coupling. The crimping fingers have recesses on their free ends as shown in FIG. 12 and FIG. 24. Thereafter, the opposite or bight end 284 of the bus bar is held while the housing is slid along the bus bar toward its free end. Such action will move the signal terminals 32 into contact with the signal wires 36 and thus the entire housing 18 and its terminals into proper position with the wires of the cable as shown in FIG. 13.

During the crimping step, the free ends 286 of the ground bus are located above the free ends of the signal contacts 32. Note FIGS. 11 and 12. Gripper fingers 288 coupled for movement by secondary handles 290 through a pivot pin 292 are utilized to grasp and pull the ground bus 22 effectively downwardly to bring the ground wire 26 and ground bus 22 into proper position with the signal wires 36 in contact with the signal contacts 32. In actuality the signal contacts and housing are raised with respect to the fixedly held ground bus. These secondary handles 290 pivot together about a pin 292 to grasp the ground bus 22 so that the tab releasers 294, tertiary handles, may pivot about pins 296 to urge the connector housing 18 upwardly so that the signal contacts 32 may contact the signal wires 36 while the ground bus 22 permits the sliding of the housing with respect thereto. Compare FIGS. 12 and 13. The signal wires are now positioned for soldering to signal contacts 32.

The primary and secondary handles 278 and 290 are pivotable on axes which are parallel with each other and parallel with the width of the cable to be coupled. Complementary axes are located on opposite sides of the slot 250. The tertiary handles 294 are pivotable on axes on opposite sides of the cable to be terminated and parallel with each other but perpendicular with respect to the axes of the primary and secondary handles and the plane of the cable to be terminated.

Soldering Station F

The soldering station is shown schematically in FIG. 1 but can be seen more readily in FIG. 14. In this orientation, the area of contact between the signal wires 12 and the signal contacts 32 and ground bus 22 is energized by radiation or other means to heat and then reflow the solder. In this manner, flux on the signal terminals and ground busses will effect a soldering of signal contacts to the signal wires of the cable end. Here again, the guide member 102 will function to allow for the proper positioning of the parts for soldering.

More specifically, either the upper end of the ground bus at the flared section and slightly therebeneath, or the U-shaped notches 308 of the signal contacts, or both, can be coated with a soldering material prior to receiving their appropriate wires. In this manner, when the wires of the ribbon cable are brought into contact with the appropriate sections of the ground bus and signal contacts, mechanical contact may be made as shown, for example, in FIGS. 13, 14, 15 and 16. As described above, the ground wires are secured into the ground bus through crimping together the upper extent of the ground contact while the ground bus is in the slot. This is followed by soldering.

The housing, with its ground contacts and signal contacts, connector wires of the cable in proper position, may then be heated as through radiant energy to liquify the solder material between the ground bus and ground wires as well as between the signal contacts and signal wires to make secure solder connections therebetween.

As shown, particularly in the FIGS. 13 through 16, the signal connector wires of the cable are bent from the vertical slightly less than a full 90 degrees. By bending them at about 70 degrees, their exterior portions remote from the bends will contact an exterior portion of the signal contacts, the edges of the signal contacts remote from the longitudinal central plane. When urged toward each other during coupling, the ends of the signal wires will be forced slightly upwardly by the signal contacts to beyond the desired 70 degrees for insuring complete contact between all of the signal wires and their signal contacts. The deflection upwardly may be between about an additional 5 and 20 degrees, but still preferably below the horizontal or 90 degree orientation. This deflection of the wire insures a secure physical contact between each signal wire and its associated signal contact prior to soldering.

The diameter of the U-shaped slot of the signal contacts is equal to or preferably slightly greater than the diameter of the conductive signal wires of the ribbon cable. The soldering may thus effect an encapsulation of at least about 270 degrees of the wires, for forming a mechanical bond as well as an electrical coupling. In practice, the solder material will often totally encapsulate the entire cross section of the signal wires along their entire lengths. Contrary to previous thoughts, a mechanical wedging action between the wire and slot to be soldered has been found to be unnecessary, and hence the diameter of the wire is preferably not greater than the width of the slot or the diameter of its bight.

In the preferred embodiment, the solder material may be applied to the appropriate portion or portions of the ground contact and signal contacts by any one of a plurality of techniques including plating, printing, silk-screening, dipping or inlaying. In the preferred embodiment, the solder material is plated onto the upper end of the ground contact and the signal contact to at least cover the U-shaped bight. The soldering may be enhanced by a commercial flux material provided onto the stripped wire ends. The solder may be caused to reflow by any one of a plurality of methods of heating, including radiant energy, resistance, laser or vapor phase. Radiant energy is the preferred embodiment.

As will be understood by one skilled in the art, the coupling of the stripped wire ends to the signal contacts is effected by adhesion between the soldering material intermediate the wires and the signal contacts, the reflowing of the soldering material therebetween effecting the coupling. It should be further understood, that the desired coupling may be effected by a wide range of adhesive coupling techniques.

Guide Member Removal Station G

With the housing now permanently secured with respect to the end of the cable, the guide member may be removed from adjacent to the cable end since the housing may now function for positioning and moving the end of the cable appropriately. The guide member 102 is removed by spring urging the latch members 126 laterally away from the base 106 of the guide member so that the upper part 104 and attached cable end may be lifted therefrom. The base may also be moved away from the cable while the parts of the guide member may be reused in association with another cable end.

Cover Station H

The last station shown in FIG. 1 is the cover station. At this station, each cover half 44 and 46 may be snapped into location with respect to the cable end and connector housing 18. The cover halves are essentially symmetric and are formed with upper body portions positionable into contact with the cable on opposite sides of the formed region. The body portions have a mating recess 310 and projection 312 for receiving and positioning the arcuate portion 82 of the cable. Resilient downwardly extending legs 48 are also located on each cover half with a space 68 therebetween to allow for the inward urging of the legs during coupling with an electronic machine or a printed circuit board 16 thereof.

Method

The eight steps performed in the method of terminating a cable end in accordance with the principles of the present invention, like the eight work stations, are indicated as letters A through H in FIG. 1. The arrow of FIG. 1 indicates the flow of work through the sequence of these method steps. One cable end being terminated is shown in FIG. 1 as progressing through the various eight method steps at the eight work stations sequentially.

Figure 8:
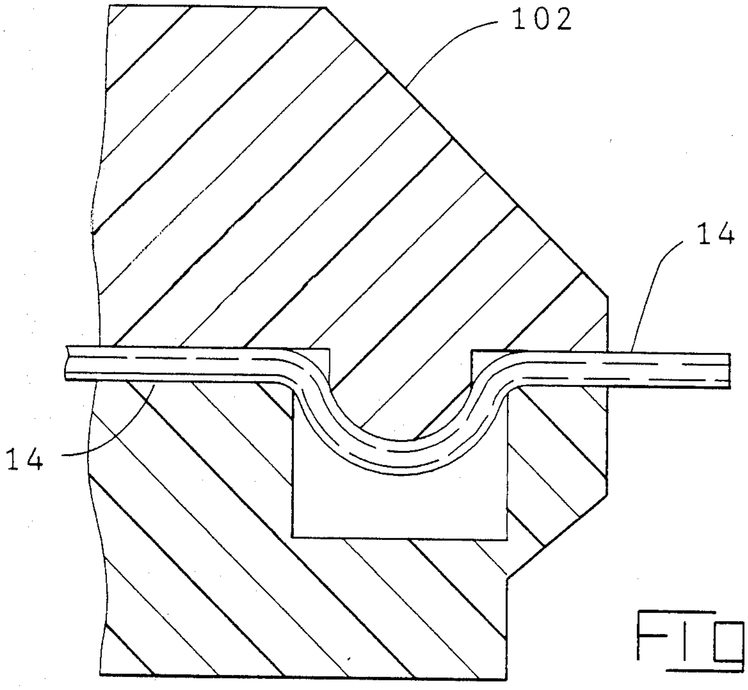
FIGS. 8–15 are fragmentary cross-sectional views sequentially illustrating the cable end as it proceeds through the various assembly steps and stations.

At the forming and trimming Station A, a cable end is formed with an arcuate bend 82, trimmed at a predetermined distance from the bend, and then positioned for receiving a handling fixture or guide member 102. The trimming can be seen in FIG. 8. The guide member is utilized throughout the majority of the processing steps or stations for accurately positioning the received and held cable end wires at the subsequent stations for having subsequent method steps performed thereon. The guide member can readily be seen in FIG. 2 as an exploded perspective illustration and in FIG. 3 in its assembled state.

The guide member applying method step is performed at station B whereat the guide member is secured on a cable end. The formed and trimmed portion of the cable near its associated end is specifically located and positioned through a cavity 132 and opposing projection 134 which extend transversely of the guide member 102. FIG. 3 illustrates the guide member secured to the cable end.

The third station, the stripping station C, is the site for the stripping step. This step can be most readily understood by reference to FIGS. 4 and 10 wherein a predetermined length of insulation is partially cut by knife blades 144 and 146 moving equally and oppositely toward the plane of the wires. Motion between the knife blades and cable, axially with respect to the wires, then pulls the cut insulation 88 from the cable end through a ripping action and thereby creates the trimmed end of a predetermined length and at a predetermined distance from its adjacent bend in the cable, i.e. the shaped portion of the cable.

The next step is the wire bending step performed at station D. This step involves the appropriate bending of stripped signal wires 36. The ground wires 26, located between the signal wires 36, are not bent. Alternate signal wires are preferably bent in alternate directions. This relationship can be seen in FIGS. 5 and 6. The mechanisms for bending the wires are shown in FIGS. 18 and 19.

Housing station E is the next following station whereat the housing applying step is performed. During this step, a preassembled cable housing 18 is coupled to the stripped and bent wires. The housing is fabricated of electrically insulating material. It is removably positioned within coupling apparatus. To the housing with its electrically conductive ground bus and terminals, there is brought the wires of the cable end, their location being determined by the guide member. FIG. 6 illustrates the housing 18 with its signal contacts 32 and ground bus 22 aligned with the guide member and supported cable end prior to their coupling. FIG. 7 illustrates the housing coupled to the guide member and wires. FIGS. 22 through 25 illustrate the mechanisms for coupling the housing to the wires of the cable end.

The method for applying or attaching the conductor wires 12 of the stripped free end of the ribbon cable 14 to a connector housing 18 first comprises the step of positioning the stripped free end in a guide member 102 and, thereafter, providing a coupling fixture having a fixed recipient block 248 with a slot 250 for the initial receipt of a connector housing 18 and for the subsequent receipt of the stripped free end. The coupling fixture has crimping fingers 274 reciprocable toward and away from the slot 250 to effect the bending of at least a portion 22 of the connector housing 18 into crimping engagement with at least some of the wires 26 to thereby couple the connector housing 18 to the wires 12. The next step includes moving the crimping fingers 274 between an inoperative orientation whereat the crimping fingers are remote from the slot 250 and an operative orientation whereat the crimping fingers 274 are adjacent to the slot 250 for the crimping of the connector housing 18 onto the wires 12. The method further includes the step of gripping that portion 22 of the connector 18 which had been crimped and moving the remainder of the connector housing 18 with respect thereto whereby the remaining wires 36 are brought into contact with other portions 32 of the connector housing 18. The portion 22 of the connector housing 18 which is crimped is a ground bus 22 and the wires which are crimped to the ground bus are unbent ground wires 26. The method further includes the step of gripping the ground bus 22 and moving the remainder of the connector housing 18 with respect to the ground bus whereby the remaining non-ground wires 36 are brought into contact with signal contacts 32 of the connector housing 18. The method further including the step of reflow soldering the wires to the connector housing.

The permanent attaching of the wires of the cable end to the terminals of the housing is effected at Station F, the soldering station. This station is shown in FIG. 14.

The guide member 102 is removed from the cable at Station G, the guide member removal station. Since the housing has been permanently attached in proper orientation with respect to the cable end, no need remains for a guide member to position the cable end for subsequent operations.

The final process step is performed at Station H, the cover station. At the cover station, cover halves 44 and 46 are applied to the housing 18 and cable end for creating the final product, a cable end with appropriate connector components attached thereto. The connector 10, with its attached cable end wires 12, may thus be removably coupled to an appropriate electronic machine. FIG. 15 illustrates the cover halves aligned with the housing for securement thereto. FIG. 16 is a sectional view of the cover halves secured with respect to the housing, with the housing supporting the signal contacts and ground bus, and with the signal contacts and ground bus attached to the wires of the cable end, all secured for coupling to a circuit board of an electronic machine.

The present disclosure includes that contained in the appended claims as well as that of the foregoing description. Although this invention has been described in its preferred forms with a certain degree of particularity, it is understood that the present disclosure of the preferred form has been made only by way of example and that numerous changes in the details of construction and combination and arrangement of parts may be resorted to without departing from the spirit of the invention.

Now that the invention has been described, What is claimed is:

1. A method for attaching the conductor wires of the stripped free end of a ribbon cable to an electrical connector comprising the steps of:

positioning the stripped free end in a guide member; providing a coupling fixture having a fixed recipient block with a slot for the initial receipt of a connector housing and for the subsequent receipt of the stripped free end, the coupling fixture having crimping fingers reciprocable toward and away from the slot to effect the bending of at least a portion of the connector into crimping engagement with at least some of the wires to thereby couple the connector to the wires; and moving the crimping fingers between an inoperative orientation whereat the crimping fingers are remote from the slot and an operative orientation whereat the crimping fingers are adjacent to the slot for the crimping of the connector onto the wires.

2. The method as set forth in claim 1 and further including the step of gripping that portion of the connector which had been crimped and moving that portion of the connector which had been crimped with respect to the connector housing whereby the remaining wires are brought into contact with other portions of the connector.

3. The method as set forth in claim 1 wherein the portion of the connector which is crimped is a ground bus and the wires which are crimped to the ground bus are unbent ground wires and further including the step of gripping the ground bus and moving the ground bus relative to the connector housing whereby the remaining non-ground wires are brought into contact with signal contacts.

4. For use in association with apparatus for terminating the free end of a ribbon cable, apparatus for coupling the stripped free end of a ribbon cable with a connector comprising:

a fixed recipient block having a slot for the receipt of the stripped and bent wires of a ribbon cable;

reciprocable blocks located on opposite sides of the fixed recipient block with crimping fingers secured thereto and reciprocal through apertures in the fixed recipient block; and means to move the reciprocable blocks and crimping fingers toward each other into the slot for effecting the mechanical coupling of the connector located in the slot with at least some of the stripped wires.

5. The coupling apparatus as set forth in claim 4 wherein the slot is of a size and shape to receive a connector housing prior to the receipt of the free end of the ribbon cable, the connector housing having electrically conductive signal contacts and an electrically conductive bus bar slidingly received within an electrically insulating portion of the connector housing.

6. The coupling apparatus as set forth in claim 5 wherein the means to move the reciprocal blocks and crimping fingers includes primary handles rotatable about axes parallel with the width of the cable and located on opposite sides thereof whereby the crimping fingers move perpendicularly with respect to the plane of the cable.

7. The coupling apparatus as set forth in claim 6 and further including pinching fingers located on opposite sides of the bus bar of the connector to hold the bus bar against movement after the crimping fingers have crimped the bus bar to the ground wires.

8. The coupling apparatus as set forth in claim 7 and further including secondary handles mounted on an axis parallel with the first axes to move the pinching fingers into and out of pinching engagement with the bus bar.

9. The coupling apparatus as set forth in claim 8 and further including tertiary handles to urge the connector housing away from the pinching fingers while the pinching fingers are in engagement with the bus bar whereby the connector housing will slide with respect to the pinched ground bus to drive the signal contacts of the connector housing into contact with bent wires of the ribbon cable which have not been pinched.

10. The coupling apparatus as set forth in claim 9 wherein the pinched wires are unbent ground wires and the other wires are bent signal wires.

11. The wire bending apparatus as set forth in claim 4 wherein the cable to be terminated is supported in a guide member with a taper in the edge thereof which supports the stripped free end of the cable and wherein the edge of the slot of the fixed recipient block which is adapted to receive guide member is tapered for matingly receiving the guide member in a precise orientation.

* * * * *